(12) United States Patent
Sahoo

(10) Patent No.: US 12,488,365 B2
(45) Date of Patent: Dec. 2, 2025

(54) SYSTEMS AND METHODS FOR MANAGING AGNOSTIC DATA FORMS FOR VENDORS

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 18/583,256

(22) Filed: Feb. 21, 2024

(65) Prior Publication Data

US 2024/0428279 A1    Dec. 26, 2024

Related U.S. Application Data

(63) Continuation-in-part of application No. 18/349,836, filed on Jul. 10, 2023, and a continuation-in-part of application No. 18/341,714, filed on Jun. 26, 2023.

(51) Int. Cl.
*G06F 16/25* (2019.01)
*G06Q 10/0631* (2023.01)
*G06Q 30/0201* (2023.01)

(52) U.S. Cl.
CPC ....... *G06Q 30/0206* (2013.01); *G06F 16/254* (2019.01); *G06F 16/256* (2019.01); *G06Q 10/06315* (2013.01)

(58) Field of Classification Search
CPC .......... G06Q 30/0206; G06Q 10/06315; G06F 16/254; G06F 16/256
See application file for complete search history.

(56) References Cited

U.S. PATENT DOCUMENTS

| 5,870,717 A | 2/1999 | Wiecha |
| 5,870,719 A | 2/1999 | Maritzen |

(Continued)

FOREIGN PATENT DOCUMENTS

| CN | 108122157 A | 6/2018 |
| JP | 2001005863 A | 1/2001 |

(Continued)

OTHER PUBLICATIONS

BasuMallic, "What is a software Engine? Tyoes, Applications, and Importance," Oct. 7, 202. URL Link: <https://www.spiceworks.com/tech/devops/articles/what-is-software-engine/>.

(Continued)

*Primary Examiner* — Merilyn P Nguyen
(74) *Attorney, Agent, or Firm* — Ice Miller LLP

(57) ABSTRACT

System and methods are provided for achieving data standardization and normalization through an Agnostic Data Format (ADF) architecture. ADFs systems and processes provide a transformative bridge, enabling disparate data sources to converge into a unified and standardized format within the Real-Time Data Mesh (RTDM) framework. This dynamic process utilizes Artificial Intelligence (AI) and Machine Learning (ML) algorithms to interpret and align diverse data attributes. The ADF management system, integrated into a dynamic event-driven architecture, allows vendors to interact with RTDM by translating and standardizing their data. The synchronized data integrates canonically, incorporating real-time updates and collaborative decision-making across the distribution platform. This innovative approach enhances operational efficiency, enables data-driven decision-making, and provides users improved ability to use data within the distribution ecosystem.

20 Claims, 28 Drawing Sheets

(56) References Cited

U.S. PATENT DOCUMENTS

| | | |
|---|---|---|
| 6,272,472 B1 | 8/2001 | Danneels |
| 6,385,543 B1 | 5/2002 | Keiser |
| 7,188,075 B1 | 3/2007 | Smirnov |
| 7,302,405 B2 | 11/2007 | Hoskin |
| 7,548,612 B2 | 6/2009 | Weissman et al. |
| 7,698,170 B1 | 4/2010 | Darr et al. |
| 7,720,720 B1 | 5/2010 | Sharma et al. |
| 8,015,021 B2 | 9/2011 | Boyle |
| 8,452,636 B1 | 5/2013 | Verastigui |
| 8,781,882 B1 | 7/2014 | Arboletti et al. |
| 9,792,597 B1 | 10/2017 | Jen |
| 9,958,291 B1 | 5/2018 | Shunturov et al. |
| 10,373,105 B2 | 8/2019 | Feng |
| 10,410,125 B1 | 9/2019 | Finkelstein et al. |
| 10,417,728 B1 | 9/2019 | Yoggi et al. |
| 10,489,845 B2 | 11/2019 | Mullakkara |
| 10,664,799 B2 | 5/2020 | O'Brien |
| 10,693,824 B2 | 6/2020 | Silva |
| 10,718,632 B1 | 7/2020 | Platt et al. |
| 10,757,154 B1 | 8/2020 | Jacobs |
| 11,062,319 B1 | 7/2021 | Hecht et al. |
| 11,074,643 B1 | 7/2021 | Ellithorpe |
| 11,113,770 B1 | 9/2021 | Magoon et al. |
| 11,163,846 B1 | 11/2021 | Kadayam et al. |
| 11,205,147 B1 | 12/2021 | Anderson |
| 11,282,145 B2 | 3/2022 | Ehrhart |
| 11,556,864 B2 | 1/2023 | Yuan et al. |
| 11,860,613 B2 | 1/2024 | Maury |
| 12,107,934 B1 | 10/2024 | Bailey et al. |
| 2002/0015480 A1 | 2/2002 | Daswani et al. |
| 2002/0023046 A1 | 2/2002 | Callahan |
| 2002/0062262 A1 | 5/2002 | Vasconi |
| 2002/0091991 A1 | 7/2002 | Castro |
| 2002/0120521 A1 | 8/2002 | Forth et al. |
| 2003/0028451 A1 | 2/2003 | Ananian |
| 2003/0055700 A1 | 3/2003 | Hoffman et al. |
| 2003/0070061 A1 | 4/2003 | Wong |
| 2003/0074248 A1 | 4/2003 | Braud |
| 2003/0130863 A1 | 7/2003 | Grey et al. |
| 2003/0144858 A1 | 7/2003 | Jain et al. |
| 2003/0149608 A1 | 8/2003 | Kall |
| 2003/0171962 A1 | 9/2003 | Hirth et al. |
| 2004/0044565 A1 | 3/2004 | Kumar et al. |
| 2004/0054800 A1 | 3/2004 | Shah et al. |
| 2004/0102981 A1 | 5/2004 | Schuh |
| 2004/0267674 A1 | 12/2004 | Feng et al. |
| 2005/0049938 A1 | 3/2005 | Venkiteswaran |
| 2005/0144082 A1 | 6/2005 | Coolman |
| 2005/0283410 A1 | 12/2005 | Gosko |
| 2006/0100889 A1 | 5/2006 | Gosko |
| 2006/0287932 A1 | 12/2006 | Wulteputte et al. |
| 2007/0033569 A1 | 2/2007 | Davidson |
| 2007/0050229 A1 | 3/2007 | Tatro et al. |
| 2008/0133569 A1 | 6/2008 | Vu et al. |
| 2008/0319849 A1 | 12/2008 | Rapoport |
| 2009/0112727 A1 | 4/2009 | Chi |
| 2009/0177714 A1 | 7/2009 | Obermeyer et al. |
| 2012/0036089 A1 | 2/2012 | Washington et al. |
| 2012/0071999 A1 | 3/2012 | Trammell et al. |
| 2012/0084215 A1 | 4/2012 | Trier |
| 2012/0226612 A1 | 9/2012 | Kurtis et al. |
| 2012/0232952 A1 | 9/2012 | Leonard |
| 2012/0316935 A1 | 12/2012 | Feuerstin |
| 2012/0323933 A1 | 12/2012 | He |
| 2013/0041781 A1 | 2/2013 | Freydberg |
| 2013/0066745 A1 | 3/2013 | De Heer et al. |
| 2014/0025529 A1 | 1/2014 | Honeycutt et al. |
| 2014/0052840 A1 | 2/2014 | Shukla |
| 2014/0095488 A1 | 4/2014 | Malone |
| 2014/0222453 A1 | 8/2014 | Wills et al. |
| 2014/0222641 A1* | 8/2014 | Kober ............... G06Q 40/04 705/37 |
| 2014/0279254 A1 | 9/2014 | Hastman |
| 2014/0322678 A1 | 10/2014 | Briancon et al. |
| 2014/0324549 A1 | 10/2014 | Chelap et al. |
| 2014/0358723 A1 | 12/2014 | Ballaro et al. |
| 2014/0379422 A1 | 12/2014 | Chapman |
| 2015/0066570 A1 | 3/2015 | Hellen |
| 2015/0189014 A1 | 7/2015 | Grunenberger |
| 2015/0281148 A1 | 10/2015 | Masterson et al. |
| 2015/0286645 A1* | 10/2015 | Sinha ............... G06F 16/9535 707/734 |
| 2016/0092474 A1 | 3/2016 | Stojanovic et al. |
| 2016/0203319 A1 | 7/2016 | Coen et al. |
| 2016/0232624 A1 | 8/2016 | Goldberg et al. |
| 2016/0239855 A1 | 8/2016 | Feng |
| 2016/0335345 A1 | 11/2016 | Wang |
| 2017/0006135 A1* | 1/2017 | Siebel ............... H04L 67/53 |
| 2017/0060641 A1 | 3/2017 | Ramaswamy |
| 2017/0091327 A1 | 3/2017 | Bostic |
| 2017/0134516 A1 | 5/2017 | Gutman |
| 2017/0193433 A1 | 7/2017 | Qin |
| 2017/0193527 A1 | 7/2017 | Becker et al. |
| 2017/0255903 A1 | 9/2017 | Chowdhry et al. |
| 2017/0287038 A1 | 10/2017 | Krasadakis |
| 2017/0364976 A1 | 12/2017 | Wiebe |
| 2018/0005296 A1 | 1/2018 | Eades et al. |
| 2018/0136992 A1* | 5/2018 | Solinger ............ G06Q 30/0275 |
| 2018/0143975 A1* | 5/2018 | Casal ............... G06F 40/51 |
| 2018/0218322 A1 | 8/2018 | Bhargava |
| 2018/0343491 A1 | 11/2018 | Loheide et al. |
| 2019/0095992 A1* | 3/2019 | Soh ............... G07F 19/20 |
| 2019/0102162 A1 | 4/2019 | Pitre et al. |
| 2019/0102753 A1* | 4/2019 | Harrison ............. H04L 67/125 |
| 2019/0147400 A1 | 5/2019 | Knight |
| 2019/0149725 A1 | 5/2019 | Adato et al. |
| 2019/0215424 A1 | 7/2019 | Adato et al. |
| 2019/0220914 A1 | 7/2019 | Flannery et al. |
| 2019/0243836 A1 | 8/2019 | Nanda et al. |
| 2019/0251457 A1 | 8/2019 | Byrnes et al. |
| 2020/0235941 A1 | 7/2020 | Nguyen |
| 2020/0279200 A1 | 9/2020 | Makhija |
| 2020/0320095 A1 | 10/2020 | Haase |
| 2020/0327252 A1 | 10/2020 | McFall |
| 2020/0334608 A1 | 10/2020 | Ramanathan et al. |
| 2020/0394398 A1 | 12/2020 | Pamarthi et al. |
| 2020/0394455 A1* | 12/2020 | Lee ............... G06N 20/00 |
| 2021/0012358 A1 | 1/2021 | Wical |
| 2021/0065294 A1* | 3/2021 | Trevathan ............ G06Q 40/08 |
| 2021/0144250 A1 | 5/2021 | Mahar |
| 2021/0158259 A1 | 5/2021 | Evans et al. |
| 2021/0166251 A1 | 6/2021 | Mehmanpazir et al. |
| 2021/0182746 A1 | 6/2021 | Muthukrishnan |
| 2021/0226573 A1 | 7/2021 | George et al. |
| 2021/0241299 A1 | 8/2021 | Ramini et al. |
| 2021/0241301 A1 | 8/2021 | Christensen et al. |
| 2021/0248151 A1* | 8/2021 | Kadel ............... G06F 16/258 |
| 2021/0269244 A1 | 9/2021 | Ahmann |
| 2021/0334871 A1 | 10/2021 | Quinn et al. |
| 2021/0350429 A1 | 11/2021 | Gangadarappa |
| 2021/0350432 A1 | 11/2021 | Kushner |
| 2021/0357959 A1 | 11/2021 | Cella et al. |
| 2022/0058723 A1 | 2/2022 | Swett et al. |
| 2022/0067085 A1 | 3/2022 | Nihas |
| 2022/0114509 A1 | 4/2022 | Pinheiro |
| 2022/0122134 A1 | 4/2022 | Hoffman et al. |
| 2022/0129803 A1 | 4/2022 | Bikumala et al. |
| 2022/0197246 A1* | 6/2022 | Cella ............... G06T 7/70 |
| 2022/0245008 A1 | 8/2022 | Deljavan Farshi et al. |
| 2022/0245727 A1 | 8/2022 | Roll et al. |
| 2022/0253775 A1 | 8/2022 | Burkhead et al. |
| 2022/0284459 A1 | 9/2022 | Kwok et al. |
| 2022/0292160 A1 | 9/2022 | Mehta et al. |
| 2022/0357971 A1 | 11/2022 | Feliciano |
| 2022/0383400 A1 | 12/2022 | Wade |
| 2022/0405775 A1 | 12/2022 | Siebel et al. |
| 2023/0005330 A1 | 1/2023 | Hartwig et al. |
| 2023/0059565 A1 | 2/2023 | Ravindran et al. |
| 2023/0074782 A1 | 3/2023 | Tendulkar |
| 2023/0075794 A1 | 3/2023 | Muttreja |
| 2023/0091441 A1* | 3/2023 | Go ............... G06F 9/451 705/36 R |
| 2023/0185878 A1 | 6/2023 | Makhija et al. |
| 2023/0206251 A1 | 6/2023 | Acharya et al. |

(56) References Cited

U.S. PATENT DOCUMENTS

| | | | |
|---|---|---|---|
| 2023/0214854 | A1 | 7/2023 | Colombier |
| 2023/0214864 | A1 | 7/2023 | Colombier |
| 2023/0222536 | A1 | 7/2023 | Hoang |
| 2023/0359161 | A1 | 11/2023 | O'Rourke et al. |
| 2023/0367696 | A1 | 11/2023 | Liu |
| 2023/0418980 | A1 | 12/2023 | Abrougui |
| 2023/0419387 | A1 | 12/2023 | Ballaro |
| 2024/0106828 | A1 | 3/2024 | Jain |
| 2024/0144170 | A1 | 5/2024 | Kim |
| 2024/0184650 | A1* | 6/2024 | O'Kelley ............... G06Q 30/08 |
| 2024/0248919 | A1 | 7/2024 | Kumar |
| 2024/0266010 | A1 | 8/2024 | Adhikari et al. |
| 2024/0281423 | A1 | 8/2024 | Perrin |
| 2024/0311853 | A1 | 9/2024 | Rendahl et al. |
| 2024/0354686 | A1 | 10/2024 | Hegde |
| 2024/0354867 | A1 | 10/2024 | Young et al. |
| 2024/0370902 | A1 | 11/2024 | Miglani |
| 2024/0427789 | A1 | 12/2024 | Sahoo |
| 2024/0428166 | A1 | 12/2024 | Sahoo et al. |
| 2025/0005479 | A1 | 1/2025 | Sahoo |
| 2025/0036648 | A1 | 1/2025 | Hunter et al. |
| 2025/0062949 | A1 | 2/2025 | Nimmagadda et al. |

FOREIGN PATENT DOCUMENTS

| | | |
|---|---|---|
| JP | 2004538542 A | 12/2004 |
| JP | 2020514860 A | 5/2020 |
| JP | 2020514860 A5 | 2/2021 |
| JP | 2021532444 A | 11/2021 |
| JP | 2022175317 A | 11/2022 |
| JP | 2023508188 A | 3/2023 |
| KR | 20070057806 A | 6/2007 |
| WO | 200233581 A2 | 4/2002 |
| WO | 02063530 A2 | 8/2002 |
| WO | 2006026673 A2 | 3/2006 |
| WO | 2018116252 A1 | 6/2018 |
| WO | 2018231850 A1 | 12/2018 |
| WO | 2022132040 A1 | 6/2022 |
| WO | 2023026313 A1 | 3/2023 |
| WO | 2024226421 A1 | 10/2024 |
| WO | 2024233674 A2 | 11/2024 |

OTHER PUBLICATIONS

Holzer et al., "Developing a Framework for Linking Design Intelligence from Multiple Professions in the AEC Industry," 2007. URL Link <https://link.springer.com/content/pdf/10.1007/978-1-4020-6528-6_23.pdf>.
PCMag. "engine" definition. Dec. 1, 2020 snaphot via Archive.org URL Link: <https://www.pcemag.com/encyclopedia/term/engine>.
Techopedia. "Engine" definition. Oct. 19, 2012. URL Link: <https://techopedia.com/24155/engine>.
Biswas S., et al., "A Proposed Architecture for Big Data Driven Supply Chain Analytics," ICFAI University Press (IUP) Journal of Supply Chain Management, 2016, vol. 13, No. 3, pp. 7-34 (24 Pages), Retrieved from URL: https://arxiv.orf/abs/1705.04958.
European Search Report for European Application No. 24186933, dated Nov. 25, 2024, 09 Pages.
Extended European Search Report for European Application No. 24184819.1, dated Nov. 27, 2024, 10 Pages.
Extended European Search Report for European Application No. 24187943.6, dated Nov. 19, 2024, 8 Pages.
Extended European Search Report for European Application No. 24187967.5, dated Nov. 25, 2024, 8 Pages.
Machado I.A., et al., "Data Mesh: Concepts and Principles of a Paradigm Shift in Data Architectures," Procedia Computer Science, Amsterdam, NL, Jan. 10, 2022, vol. 196, pp. 263-271. DOI: 10.1016/j.procs.2021.12.013, ISSN: 1877-0509, XP093050267, Retrieved from URL: https://ww.sciencedirect.com/science/article/pii/S18770500921022365.
Office Action for Japanese Application No. 2024-101794, dated Sep. 13, 2024, 21 Pages.
Office Action for Japanese Application No. 2024-10629, dated Oct. 29, 2024, 10 Pages.
Office Action for Japanese Application No. 2024-112073, dated Oct. 15, 2024, 9 Pages.
Suzumura K., "Latest IT Trends by Field: Inter-System Integration: The Key Lies in the Use of Open Technology, Performance and Reliability," Nikkei Computer, Japan, Nikkei BP, Sep. 23, 2002, No. 557, pp. 28-29 (6 Pages), ISSN 0285-4619.
Wikipedia "Data Mesh," May 25, 2023, 3 Pages, XP093199672, Retrieved from URL: https://en.Wikipedia.ord/w/index.php?title=Data_mesh&oldid=1157039904.
Agarwal, Saloni et al., "Improving Bundles Recommendation Coverage in Sparse Product Graphs," WWW 22 Companion, 2022, all pgs.
Carlos, Rafael et al., "Framework for Continuous Agile Technoloy Roadmap Updating," Emeraldinsight.com, 2017, all pages.
Decision of Refusal issued in Japanese Patent Application No.2024-108629, dated Apr. 11, 2025, 5 pgs.
Englsih Translation of Decision of Refusal issued in Japanese Patent Application No. 2024-108629, dated Apr. 11, 2025, 7 pgs.
Office Action issued in Japanese Patent Application No. 2024-101794, dated May 16, 2025, 6 pgs.
English Translation of Office Action issued in Japanese Patent Application No. 2024-101794, dated May 16, 2025, 5 pgs.
European Search Report issued in European Patent Application No. 25163362.4, dated May 2, 2025, 10 pgs.
European Search Report issued in European Patent Application No. EP25156175.9, dated Mar. 13, 2025.
Examination Report issued in Australian Patent Application No. 2024204660, dated Apr. 16, 2025, 4 pgs.
Examination Report issued in Australian Patent Application No. 20244204340, dated Feb. 28, 2025, 5 pgs.
Examination Report issued in Australian Patent Application No. 2025200528, dated Mar. 6, 2025, 5 pgs.
Examination Report issued in Australian Patent Application No. 2025200535, dated Apr. 7, 2025,7 pgs.
Examination Report issued in Australian Patent Application No. 2025200793, dated Apr. 1, 2025, 9 pgs.
Examination Report issued in Australian Patent Application No. 2025201639, dated Apr. 30, 2025, 6 pgs.
Examination Report issued in Australian Patent Application No. 2025201740, dated Mar. 18, 2025, 5 pgs.
Kohut, Yurii et al., "Recommndation System for Purchasing Goods based on the Decision Tree Algorithm," Advances in Cyber-Physical Systems, vol. 6, No. 2, 2021, 7 pgs.
Palo, Joonas, "Product Roadmapping Tool and Process Unification as part of a Global End-to-End Repeatability Operating Model Development," Haaga-helia, 2023, all pgs.
Sutton, Rowan et al., "A Reinforcement Learning and Synthetic Data Approach to Mobile Notification Management," ACM, 2019, all pgs.
Sun, Zhu et al., "Revisiting Bundle Recommendatin: Datasets, Tasks, Challenges and Opportunities for Intent Aware Product Bundling," Association for Computing Machinery, Spain, SIGIR 2022, 12 pgs.
Search Report from European Patent Application No. 25154230.4, dated Jul. 10, 2025, 10 pgs.

* cited by examiner

SYSTEMS AND METHODS FOR MANAGING AGNOSTIC DATA FORMS FOR VENDORS

CROSS REFERENCE TO RELATED APPLICATIONS

This application is a Continuation-In-Part (CIP) of U.S. patent application Ser. No. 18/341,714, filed on Jun. 26, 2023; U.S. patent application Ser. No. 18/349,836, filed on Jul. 10, 2023; U.S. provisional application No. 63/513,073, filed on Jul. 11, 2023; U.S. provisional application No. 63/513,078, filed on Jul. 11, 2023; U.S. provisional application No. 63/515,075, filed on Jul. 21, 2023; and U.S. provisional application No. 63/515,076, filed on Jul. 21, 2023. Each of these applications is incorporated herein by reference in its entirety.

BACKGROUND

This invention relates to the aspects of a real-time data mesh method and system that encompass distribution, supply chain management, and related functionalities.

The traditional global distribution industry faces a multitude of challenges that encompass distribution management, supply chain management, inventory control, SKU management, compliance, and evolving consumer expectations. Traditionally, distribution and supply chain management, not being core competencies for many distributors, have been fraught with inefficiencies. Inventory control has long been a significant concern, with market fluctuations demanding flexible distribution and supply chain models. SKU management and localization have added layers of complexity due to divergent data from various OEMs and the requirements of differing jurisdictions. Compliance with international regulations has also demanded additional vigilance and paperwork. Finally, traditional customer interaction methods are quickly becoming outdated with the shift towards ecosystem commerce.

An ERP (Enterprise Resource Planning) system is a software system that integrates and manages various core business processes and functions within an organization. It serves as a centralized database and platform that allows different departments and functions, such as finance, human resources, procurement, inventory management, production, sales, and distribution, to share and access information in real-time. In complex distribution and distribution ecosystems, managing and optimizing the flow of goods, services, and information is crucial for businesses to remain competitive and meet customer demands. However, traditional systems often face numerous challenges that hinder efficiency, visibility, and decision-making capabilities. These challenges include data fragmentation, limited integration, data inconsistency, inefficient data processing, and data security concerns.

Data fragmentation is a prevalent issue in distribution and supply chain systems, where data is stored in various systems and departments, often legacy systems such as ERPs, leading to information silos. As a result, users struggle to access real-time and comprehensive insights into critical distribution and supply chain metrics, hindering their ability to make informed decisions and respond promptly to changing market dynamics. Additionally, data inconsistency arises when information is stored in different formats, making it challenging to maintain data integrity and ensure accurate analysis.

Furthermore, the lack of integration capabilities between disparate systems impedes the flow of data across the distribution and supply chain. Integrating data from multiple sources, including ERPs, legacy systems, and external providers, becomes a complex and time-consuming process. This limits the overall view and optimization of operations. Moreover, inefficient data processing and analysis pose another significant challenge in distribution and supply chain management. Traditional systems often struggle to handle the volume, variety, and velocity of distribution and supply chain data. Extracting meaningful insights and actionable intelligence from this vast amount of data becomes a daunting task. Inefficient data processing affects trend identification, forecasting, and decision-making.

Additionally, data security and governance concerns are critical factors in distribution and supply chain management. Distribution and supply chain data often contain sensitive information, including customer data, pricing details, and contractual agreements. Ensuring the security, privacy, and compliance of this data is paramount to protect against unauthorized access and breaches. Compliance with industry regulations and maintaining data integrity further complicate the data management landscape.

Moreover, the distribution industry is challenged by divergent data formats employed by technology product vendors. Vendors can serve diverse functions within the industry, disseminating pivotal data encompassing product catalogs, pricing intricacies, availability statuses, order progression updates, and intricate shipping particulars. However, this data lacks a standardized uniformity; instead, it traditionally requires a myriad of formats and languages. This multiplicity in data presentation presents a challenge within the industry. Conventional systems lack specialized proficiency and in-depth recognition of distinctive product offerings of each vendor. Alternatively, organizations are required to invest substantial time and resources to devise tailored automated systems. However, conventional bespoke systems encounter inherent constraints and considerable costs in their development for each individual vendor. Both approaches introduce inefficiencies that disrupt the flow of information.

This challenge requires excess investment of time and resources to onboard vendors onto a marketplace platform. Existing solutions inadvertently curtail the number of vendors that can viably participate, resulting in a restricted array of products accessible to customers. Moreover, real-time order statuses remain elusive, as does the timely provision of pricing and availability data on a comprehensive scale. This challenge is further compounded by the issue of cost. Costs of adding a new vendor to an existing platform with different data formats are high. This financial burden curtails the expansion of the vendor base, particularly affecting smaller vendors who might lack the resources needed to align their data systems. The disjointed data landscape begets inefficiencies, redundant efforts, and escalated costs. It thwarts collaboration, imposes constraints on transparency, and undermines the potential for streamlined operations within the technology ecosystem.

BRIEF SUMMARY OF THE INVENTION

The global distribution industry faces critical challenges across various domains. These challenges include distribution management, supply chain complexities, inventory and compliance issues, SKU management, the shift to direct-to-consumer models, and evolving consumer behavior.

One key challenge is distribution process management, which often falls outside a distributor's core competencies, leading to inefficiencies and difficulties in handling disruptions. This impacts a distributor's ability to deliver products efficiently. Additionally, the trend toward direct-to-consumer models is reshaping the distribution landscape, necessitating a reevaluation of existing business strategies.

In some embodiments, systems and methods for managing agnostic data forms (ADFs) are introduced, particularly for vendors in a distribution platform. These ADF systems and methods use AI and ML technologies to address the persistent challenge of diverse data formats in the technology industry. By using AI and ML capabilities, ADF systems and methods offer a technical approach that accommodates various vendor data structures. Vendor onboarding within marketplace platforms is extended to vendors of all sizes, enabling smaller entities to align their data with marketplace requirements. This allows for a more diverse and dynamic vendor ecosystem.

In some embodiments, an agnostic data format facilitates diverse product management within a distribution platform. AI and ML technologies are employed to manage disparate data formats in the technology industry, particularly within a distribution platform. By leveraging AI and ML, the invention introduces an approach to understand diverse vendor data structures. This solution has broad implications, reshaping the industry with impactful outcomes.

The disclosure provides systems and methods for implementing agnostic data forms (ADFs) enabling vendor onboarding within expansive marketplace platforms. This inclusivity extends to vendors of all sizes, enabling smaller entities aligning their data with marketplace requisites, fostering a dynamic vendor ecosystem. Additionally, the adoption of this agnostic data format redefines product variety. Traditional limitations imposed by data format disparities become obsolete. Marketplaces can encompass a rich variety of products, enhancing customer choices and product discovery.

The improvement advances competitiveness with respect to vendors. With standardized data formats, competition centers on factors like product quality, availability, pricing, and services, enhancing the customer experience. From a functional perspective, the transformation reduces costs associated with onboarding vendors. The laborious process of harmonizing divergent data structures is streamlined. The invention introduces agility through near-real-time vendor onboarding, enabling platforms to respond to industry dynamics promptly.

Integrating AI-driven insights is significant and advantageous. With AI and ML in data exchange, users receive actionable insights for optimal transactions, enabling databacked decisions. AI and ML technologies bridge agnostic data formats, heralding a transformation characterized by inclusivity, competition, and efficiency. The invention dispels data heterogeneity complexity, fostering thriving marketplaces, enriched customer experiences, and unlocking the technology ecosystem's potential.

Despite challenges, the distribution model offers advantages. Manufacturers focus on core competencies, while distribution networks extend product reach and offer value-added services. To remain relevant and effective, the ADFs systems and methods provided herein enables the distribution model to evolve, addressing current pain points and streamlining processes. The systems and methods described herein simplify vendor onboarding and focus on customer needs.

Single Pane of Glass

The Single Pane of Glass (SPoG) can provide a comprehensive solution that aims to address these multifaceted challenges. It can be configured to provide a comprehensive, user-friendly, and efficient platform that streamlines the distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers a technical solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, to streamline SKU management and product localization, SPoG integrates data from various OEMs into a single platform. This not only ensures data consistency but also significantly reduces the potential for errors. Furthermore, it provides capabilities to manage and distribute localized SKUs efficiently, thereby aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, streamlining inventory management, ensuring compliance, simplifying SKU management, and delivering a superior customer experience, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can include implementation(s) of a Real-Time Data Mesh (RTDM), according to some embodiments. RTDS offers a technical solution to address these challenges. RTDM, a distributed data architecture, enables real-time data availability across multiple sources and touchpoints.

This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM also simplifies SKU management and localization by integrating data from various OEMs, ensuring data consistency and reducing error potential. Its capabilities for managing and distributing localized SKUs align with specific market needs efficiently.

The RTDM enhances customer experience with its intuitive interface, allowing easy access and purchase of technology, meeting the expectations of the new generation of tech buyers.

Advantages of SPoG and RTDM Integration

Integrating SPoG platform with the RTDM provides a myriad of advantages. Firstly, it offers a comprehensive solution to the longstanding problems in the distribution industry. With the RTDM's capabilities, SPoG can enhance supply chain visibility, streamline inventory management, ensure compliance, simplify SKU management, and deliver a superior customer experience.

The real-time tracking and analytics offered by RTDM improve SPoG's ability to manage the supply chain and inventory effectively. It provides accurate and up-to-date information, enabling distributors to make informed decisions quickly.

Integrating SPoG with RTDM also ensures data consistency and reduces errors in SKU management. By providing a centralized platform for managing data from various OEMs, it simplifies product localization and helps to align with market needs.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can use the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
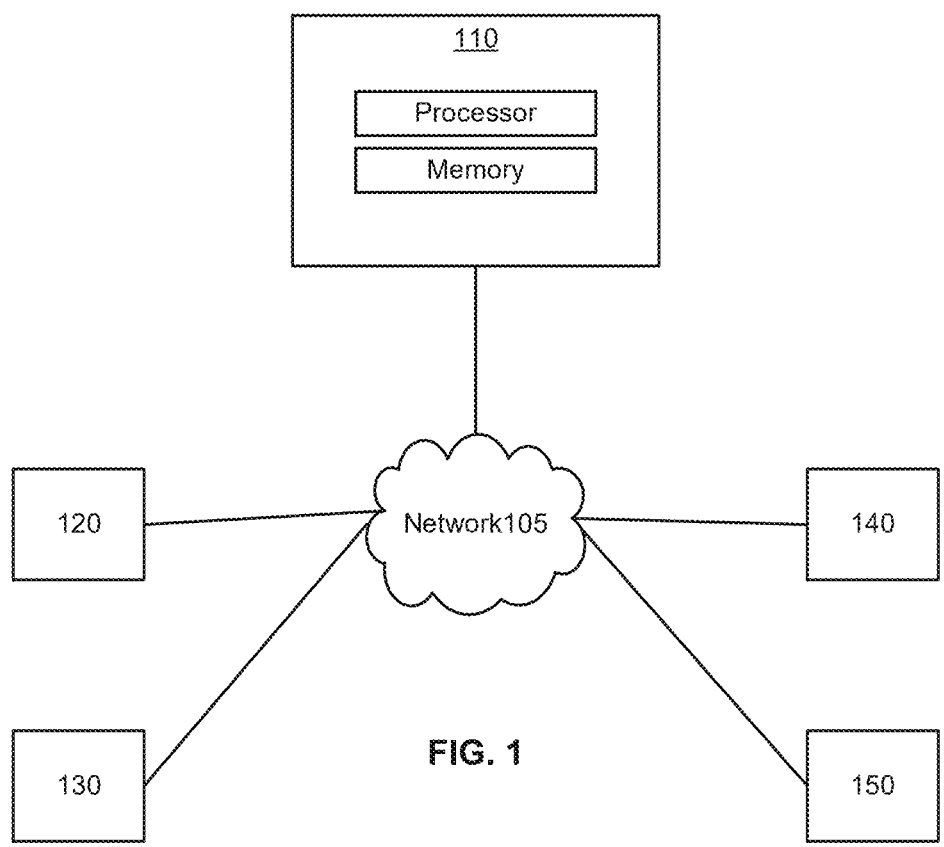
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, enabling them to make informed decisions and optimize their IT infrastructure.

End customers 130 are the ultimate beneficiaries of the IT solutions provided by System 110. They may include businesses or individuals who utilize IT products and services to enhance their operations, productivity, or daily activities.

End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of System 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can use System 110 to streamline their supply chain operations, manage pricing and promotions, and gain insights into customer preferences and market trends. In some embodiments, System 110 can include dynamics and to facilitate vendor effectiveness, including the implementation of ADFs. Thereby, System 110 is configured to handle large-scale data ingestion in diverse formats, as well as processing, storage, and analysis, ensuring support for evolving needs of the distribution platform, including the efficient management of ADFs. These dynamics include real-time data exchange, integration with existing enterprise systems, scalability, and flexibility. System 110 ensures that relevant data is exchanged in real-time between users, enabling accurate decision-making and timely actions. Integration with existing enterprise systems such as ERP systems, CRM systems, and warehouse management systems allows for communication and interoperability, eliminating data silos and enabling end-to-end visibility. By integrating with System 110, vendors can expand their reach, access new markets, and enhance their overall visibility and competitiveness.

Resellers 150 are intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a catalog of IT solutions, manage their sales pipeline, and provide value-added services to customers. By leveraging System 110, resellers can enhance their customer relationships, optimize their product offerings, and increase their revenue streams.

Within the operating environment of System 110, there are various dynamics and characteristics that contribute to its effectiveness. These dynamics include real-time data exchange, integration with existing enterprise systems, scalability, and flexibility. System 110 ensures that relevant data is exchanged in real-time between users, enabling accurate decision-making and timely actions. Integration with existing enterprise systems such as enterprise resource planning (ERP) systems, customer relationship management (CRM) systems, and warehouse management systems allows for communication and interoperability, eliminating data silos and enabling end-to-end visibility.

Scalability and flexibility are key characteristics of System 110. It can accommodate the growing demands of the IT distribution model, whether it involves an expanding customer base, an increasing number of vendors, or a wider range of IT products and services. System 110 is designed to handle large-scale data processing, storage, and analysis, ensuring that it can support the evolving needs of the distribution platform. Additionally, System 110 uses a technology stack that includes NET, Java, and other suitable technologies, providing a robust foundation for its operations.

The operating environment of System 110 within the IT distribution model encompasses customers 120, end customers 130, vendors 140, resellers 150, and other entities involved in the distribution process. System 110 serves as a centralized platform that facilitates efficient collaboration, communication, and transactional processes between these users. By leveraging real-time data exchange, integration, scalability, and flexibility, System 110 enables users to optimize their operations, enhance customer experiences, and drive business success within the IT distribution ecosystem.

Figure 2:
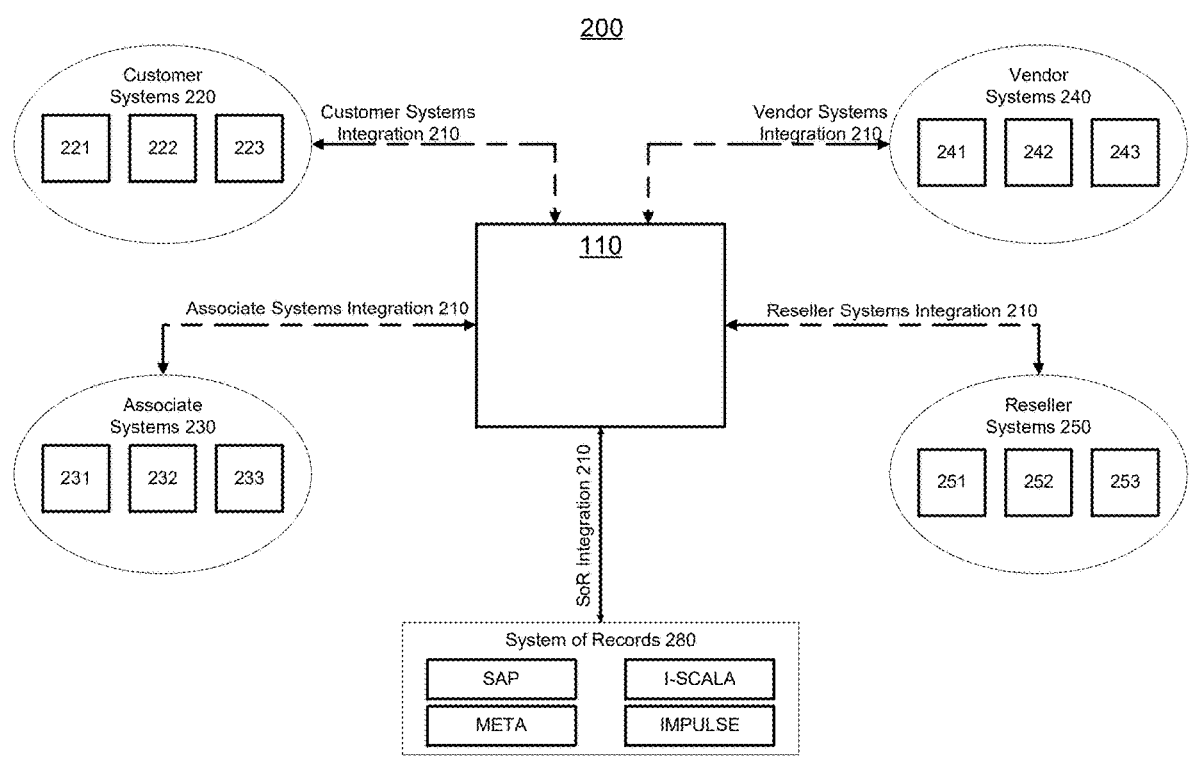
FIG. 2 illustrates one embodiment of an operating environment of the distribution platform, which builds upon the elements introduced in FIG. 1.

FIG. 2 illustrates an operating environment 200 of the distribution platform, which builds upon the elements introduced in FIG. 1. Within this operating environment, integration points 210 facilitate data flow and connectivity between various customer systems 220, vendor systems 240, reseller systems 260, and other entities involved in the distribution process. The diagram showcases the interconnectedness and the mechanisms that enable efficient collaboration and data-driven decision-making. This operating environment is configured to implement ADFs systems and processes utilizing advanced Artificial Intelligence (AI) and Machine Learning (ML) technologies to integrate, process, and analyze data from diverse sources, making it agnostic to the specific data formats used by customers, vendors, and resellers.

Operating environment 200 can include System 110 as a distribution platform that serves as the central hub for managing and facilitating the distribution process. System 110 can be configured to perform functions and operations as a bridge between customer systems 220, vendor systems 240, reseller systems 260, and other entities within the ecosystem. It can integrate communication, data exchange, and transactional processes, providing users with a unified and streamlined experience. Moreover, operating environment 200 can include one or more integration points 210 to ensure smooth data flow and connectivity. This integration utilizes advanced AI and ML technologies that enable System 110 to recognize, standardize, and process data in various formats, ensuring that data flows between interconnected systems. These integration points include:

Customer System Integration: Integration point 210 can enable System 110 to connect with customer systems 220, enabling efficient data exchange and synchronization. Customer systems 220 may include various entities such as customer system 221, customer system 222, and customer system 223. These systems represent the internal systems utilized by customers, such as enterprise resource planning (ERP) or customer relationship management (CRM) systems. Integration with customer systems 220 enables customers to access real-time inventory information, pricing details, order tracking, and other relevant data, enhancing their visibility and decision-making capabilities. The use of ADFs within System 110 ensures that vendor data in various formats is integrated, providing customers with a unified and efficient interface. The integration between System 110 and customer systems is further enhanced by AI and ML, which not only ensure data compatibility but also provide predictive analytics to optimize inventory management and pricing strategies.

Vendor System Integration: Integration point 210 facilitates the connection between System 110 and vendor systems 240. Vendor systems 240 may include entities such as vendor system 241, vendor system 242, and vendor system 243, representing the inventory management systems, pricing systems, and product catalogs employed by vendors. Integration with vendor systems 240 ensures that vendors can efficiently update their product offerings, manage pricing and promotions, and receive real-time order notifications and fulfillment details. In some non-limiting examples, ADF components and processes, described in detail below, within embodiments of System 110 enable vendors to provide data in their preferred formats, which is transformed and integrated into the platform for efficient processing. The advanced AI and ML capabilities of System 110 enable vendors to not only integrate their data but also use predictive analytics to optimize their pricing strategies, identify demand trends, and enhance product catalog management.

Reseller System Integration: Integration point 210 provides capabilities for reseller systems 260 to connect with System 110. Reseller systems 260 may encompass entities such as reseller system 261, reseller system 262, and reseller system 263, representing the sales systems, customer management systems, and service delivery platforms employed by resellers. Integration with reseller systems 260 enables resellers to access up-to-date product information, manage customer accounts, track sales performance, and provide value-added services to their customers. In some embodiments, ADF capabilities of System 110 can also ensure that reseller data, regardless of its format, is efficiently integrated, supporting streamlined reseller operations.

Other Entity System Integration: Integration point 210 also enables connectivity with other entities involved in the distribution process. These entities may include entities such as entity system 271, entity system 272, and entity system 273. Integration with these systems ensures communication and data exchange, facilitating collaboration and efficient distribution processes. In some embodiments, the use of ADFs can extend to other entities, ensuring that data from diverse sources is effectively incorporated into the distribution ecosystem.

Integration points 210 within the operating environment 200 are facilitated through standardized protocols, APIs, and data connectors. These mechanisms ensure compatibility, interoperability, and secure data transfer between the distribution platform and the connected systems. System 110 employs industry-standard protocols, such as RESTful APIs, SOAP, or GraphQL, to establish communication channels and enable data exchange.

In some embodiments, System 110 can incorporate authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable users to operate within a connected ecosystem. Data generated at various stages of the distribution process, including customer orders, inventory updates, shipment details, and sales analytics, flows between customer systems 220, vendor systems 240, reseller systems 260, and other entities. This data exchange facilitates real-time visibility, enables data-driven decision-making, and enhances operational efficiency throughout the distribution platform.

In some embodiments, System 110 uses advanced technologies such as Typescript, NodeJS, ReactJS, NET Core, C#, and other suitable technologies to support the integration points 210 and enable communication within the operating environment 200. These technologies provide a robust foundation for System 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 enable users to operate within a connected ecosystem. Data generated at various touchpoints, including customer orders, inventory updates, pricing changes, or delivery status, flows between the different entities, systems, and components. The integrated data is processed, standardized, and made available in real-time to relevant users through System 110. This real-time access to accurate and up-to-date information enables users to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, could include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI) provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Thereby, operating environment 200 can couple a distribution platform with one or more integration points 210 and data flow to enable efficient collaboration and streamlined distribution processes.

Figure 3:
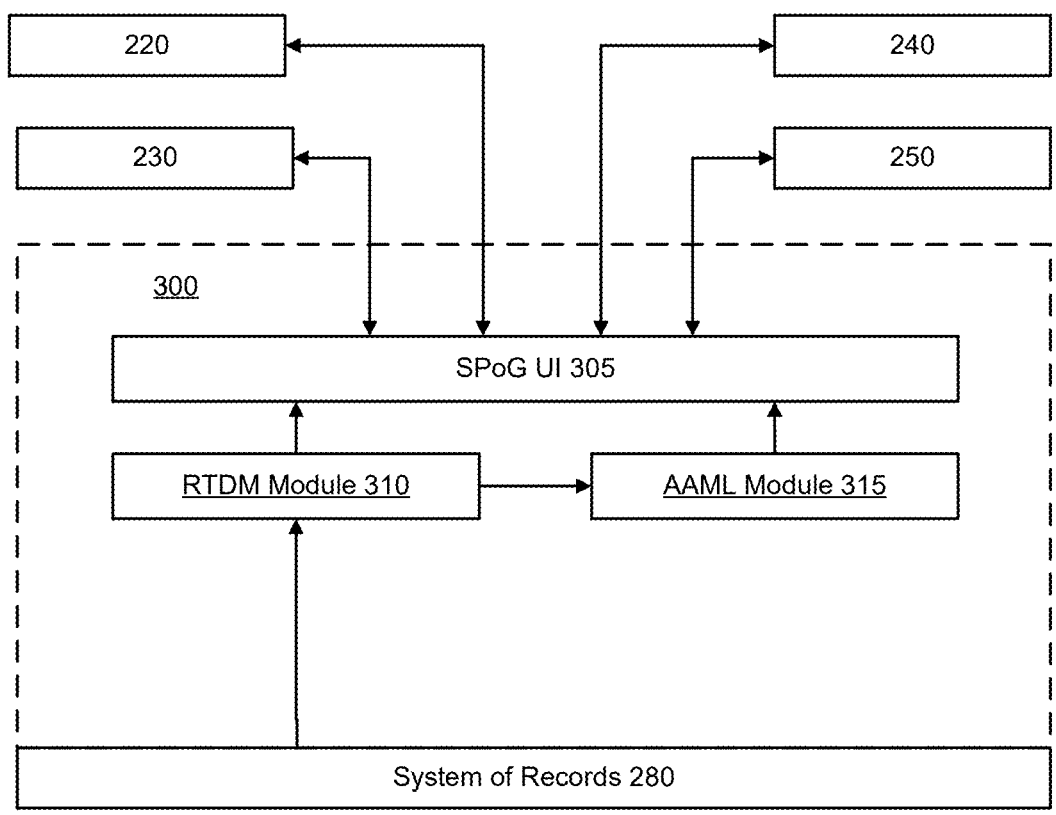
FIG. 3 illustrates one embodiment of a system for supply chain and distribution management.

FIG. 3 illustrates a system 300 for supply chain and distribution management. System 300 (FIG. 3) is a supply chain and distribution management solution designed to address the challenges faced by fragmented distribution ecosystems in the global distribution industry. System 300 can include several interconnected components and modules that are configured to improve supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, enabling them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

In another example, vendors can use the SPoG UI to oversee management of diverse data formats. Through an intuitive interface, a distribution system can enable vendors to upload an array of data elements encompassing product catalogs, pricing specifics, availability statuses, order progress, shipping particulars, and manage forms in a data agnostic system. In this context, a real-time data mesh provides a fundamental component configured to perform ingestion and transformation of an otherwise challenging array, converging these data formats by an ADF system and methodology into a standardized structure within the RTDM architecture. An artificial intelligence (AI) module can execute algorithms configured to perform attribute matrix analysis and neural network processing, for example, to dynamically interpret and align vendor-unique data attributes with the cohesive schema of the RTDM. This transformative process transcends conventional data conversion, providing a dynamic solution to the challenge of standardizing disparate data formats.

The SPoG UI 305 integrates with other modules of System 300, facilitating real-time data exchange, synchronized operations, and streamlined workflows. Through API integrations, data synchronization mechanisms, and event-driven architectures, SPoG UI 305 ensures smooth information flow and enables collaborative decision-making across the distribution ecosystem.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

In another example, API integrations enable an ADF management system in a dynamic event-driven architecture, where vendors interact canonically with the Real-Time Data Mesh (RTDM) framework. A vendor can update various disparate datasets including inventory, product pricing and availability, through their native data formats. API integrations can be provided to perform instant ingestion of the data in an ADF management system, which utilizes the AI Module 780 to translate and standardize these vendor-specific attributes. Consequently, within the RTDM's unified data structure, this transformed information integrates with other modules of the System 300. This fluid integration goes beyond the confines of conventional data interchange, catalyzing the synchronization of inventory updates, order status notifications, and shipping confirmations across the distribution network. The result is an ecosystem where vendor forms are translated, synchronized, and enhanced, propelling collaborative decision-making and improving the operational efficacy of the entire distribution ecosystem.

The Real-Time Data Mesh (RTDM) module 310 is another component of System 300, responsible for ensuring the flow of data within the distribution ecosystem. It aggregates data from multiple sources, standardizes it, and ensures its availability in real-time.

To illustrate the capabilities of the RTDM module, let's consider an example. In a distribution network, the RTDM module collects data from various systems, including inventory management systems, point-of-sale terminals, and customer relationship management systems. It harmonizes this data by aligning formats, standardizing units of measurement, and reconciling any discrepancies. The standardized data is then made available in real-time, allowing users to access accurate and up-to-date information across the supply chain.

The RTDM module 310 can be configured to capture changes in data across multiple transactional systems in real-time. It employs a Change Data Capture (CDC) mechanism that constantly monitors the transactional systems, detecting any updates or modifications. The CDC component is specifically designed to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time standardization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging analytics tools and algorithms AAML module 315 can perform processes involving ADF ingestion as well as extracting valuable insights from the collected data. It enables advanced analytics, predictive modeling, anomaly detection, and other machine learning capabilities. For instance, AAML module 315 can analyze historical sales data to identify seasonal patterns and predict future demand. It can generate forecasts that help optimize inventory levels, ensure stock availability during peak seasons, and minimize excess inventory costs. By leveraging machine learning algorithms, AAML module 315 automates repetitive tasks, predicts customer preferences, and optimizes supply chain processes. In some embodiments, the AI-driven decision-making of AAML module 315 not only enhances efficiency but also reduces operational costs and ensures that the supply chain remains agile and responsive to market dynamics.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a comprehensive and connected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a technical solution that addresses the challenges faced by fragmented distribution ecosystems. It combines the power of the SPoG UI 305, the RTDM module 310, and the AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain and distribution management.

Figure 4:
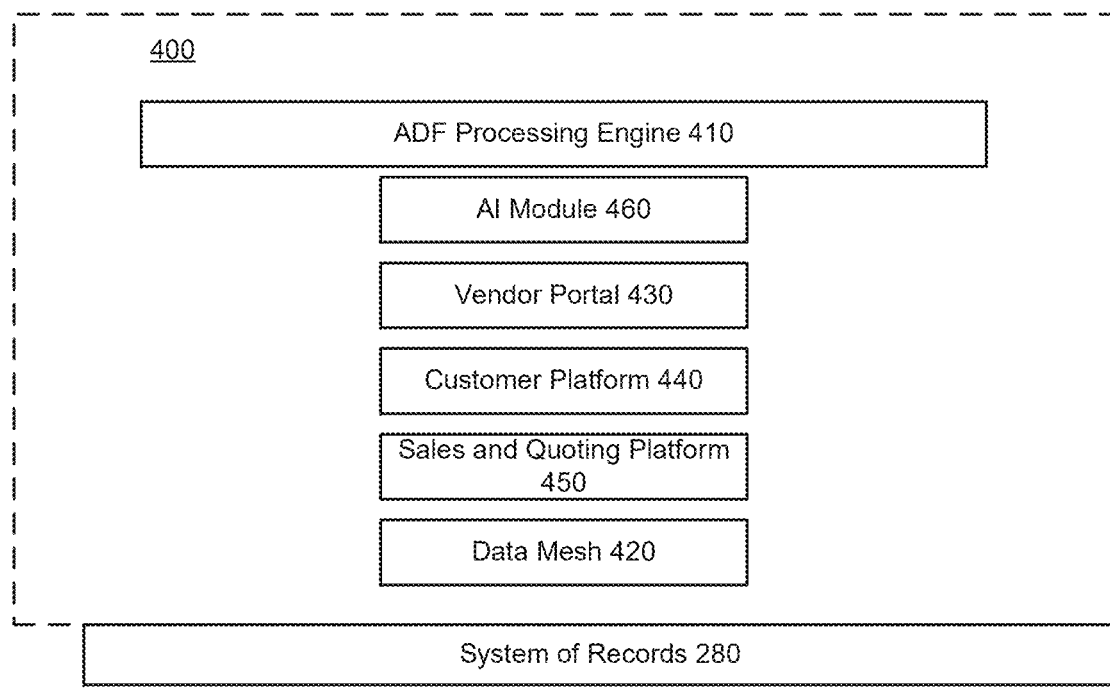
FIG. 4 illustrates a distribution platform including architecture supporting integration of agnostic data forms (ADFs), according to some embodiments.

FIG. 4 depicts a system 400 designed to facilitate the integration of agnostic data forms (ADFs) from various vendors as discussed. This figure illustrates the core architecture that enables the company to transform and standardize diverse data formats from vendors, enabling streamlined interactions, efficient onboarding, and real-time synchronization. The various elements in this figure create a unified platform for data exchange and vendor interactions.

ADFs Processing Engine 410 is configured for receiving data in varying formats from different vendors, extracting the relevant attributes, and transforming the data into a standardized format. In some embodiments, the ADFs Processing Engine 410 employs advanced artificial intelligence (AI) algorithms and machine learning (ML) techniques to analyze the incoming data and identify correlations among attributes. For instance, it can recognize that Vendor A's SKU attribute corresponds to Vendor B's Product Code, despite their disparate labels. The ADFs Processing Engine 410 effectively bridges this linguistic gap and generates a unified set of attributes, regardless of the original data format.

Upon transforming the vendor data, the ADFs Processing Engine 410 collaborates with the Data Mesh 420 element to ensure integration and synchronization. The Data Mesh 420 acts as a centralized repository that stores the standardized data, allowing various operational components to access consistent and up-to-date information. This integration ensures that data discrepancies are minimized, enabling real-time updates across multiple touchpoints within the company's operations. The ADFs Processing Engine 410 feeds the transformed data into the Data Mesh 420, which then propagates the changes to the various downstream systems.

Interactions with vendors are facilitated through the Vendor Portal 430, which serves as a user-friendly interface for vendors to upload their data. Vendors can upload their data in various formats, and the ADFs Processing Engine 410 undertakes the task of transforming this data into the standardized format. In some embodiments, the Vendor Portal 430 includes interactive features that allow vendors to review and provide feedback on the transformed data before it is integrated into the system. This feedback loop ensures accuracy and consistency in the integration process.

The transformed and standardized data, residing within the Data Mesh 420, directly benefits the Customer Platform 440 and the Sales and Quoting System 450. The Customer Platform 440 is the interface through which customers interact with the company's offerings. By leveraging the standardized data, customers gain access to accurate and consistent information about products, pricing, availability, and more. This not only enhances the customer experience but also expedites decision-making and purchasing processes.

Similarly, the Sales and Quoting System 450 uses the standardized data to generate quotes and pricing information for customers. In some embodiments, the Sales and Quoting System 450 is connected to the Data Mesh 420 via direct interfaces or APIs, ensuring that the most current and accurate data is utilized in generating quotes. This integration eliminates manual interventions and reduces errors, promoting efficiency and accuracy in the sales process.

Furthermore, the AI Insights Module 460 provides valuable data-driven insights to both vendors and customers. Leveraging the transformed data within the Data Mesh 420, the AI Insights Module 460 employs AI and ML algorithms to identify trends, patterns, and opportunities within the vendor-customer ecosystem. For example, the AI Insights Module 460 could analyze purchasing behaviors to recommend product bundles that align with customer preferences, enhancing cross-selling opportunities.

Accordingly, an ADF system architecture manages agnostic data forms (ADFs) for vendors. By orchestrating interactions of the ADFs Processing Engine 410, Data Mesh 420, Vendor Portal 430, Customer Platform 440, Sales and Quoting System 450, and AI Insights Module 460, the company achieves integration of diverse vendor data. This integration enables efficient onboarding, real-time synchronization, and data-driven insights, ultimately enriching the experience for vendors, customers, and the company itself. Together these elements enable the innovative potential of leveraging AI and ML technologies to bridge the gap between disparate data formats and drive standardization in the technology distribution industry.

Figure 5:
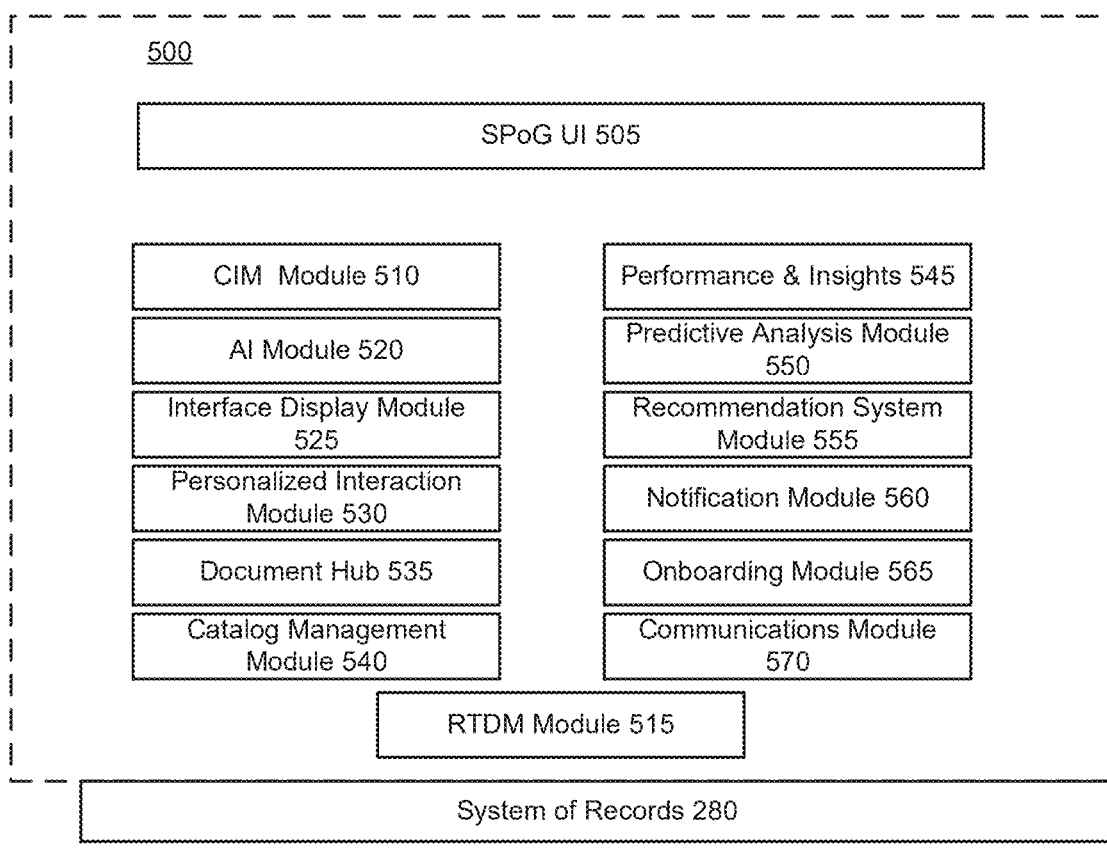
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, uses a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a critical component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access up-to-date and accurate information for informed decision-making.

The AI module 520 within System 500 uses advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of up-to-date product catalogs. It ensures that users have access to the latest product information, including specifications, pricing, availability, and promotions. Technologies like Kentico and Akamai are employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark are employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico are employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch are employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
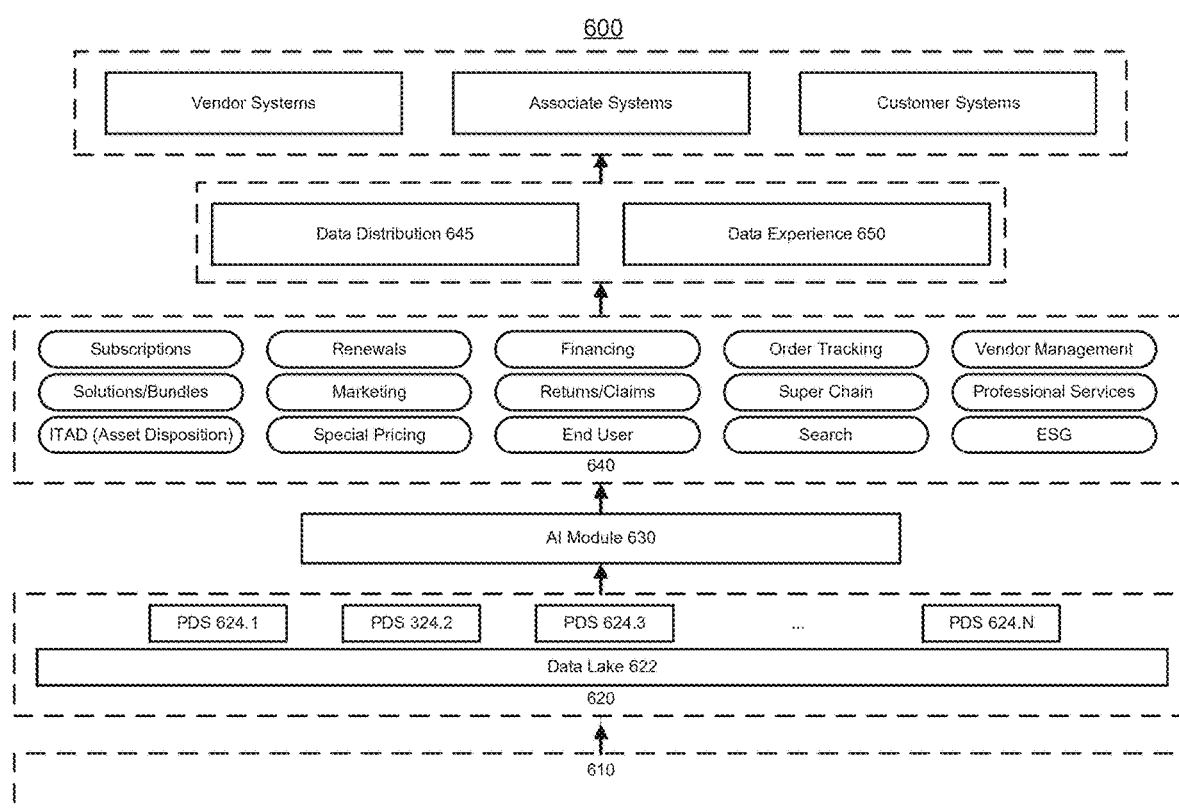
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module is designed to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds are established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. At the core of the data layer is the data mesh, a cloud-based infrastructure designed to provide scalable and fault-tolerant data storage capabilities. Within the data mesh, multiple Purposive Datastores (PDS) are deployed to store specific types of data, such as customer data, product data, or inventory data. Each PDS is optimized for efficient data retrieval based on specific use cases and requirements. The PDSes are configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data is then processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability.

At the core of data layer 620 lies the data lake, data lake 622, a state-of-the-art storage and processing infrastructure designed to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms are integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as .NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 uses the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as NET or Java, and/or distributed computing frameworks like Apache Spark, enables powerful data processing, advanced analytics, and machine learning capabilities. With robust data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and up-to-date insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine is designed to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms are applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, up-to-date information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

Agnostic Data Forms System

Figure 7:
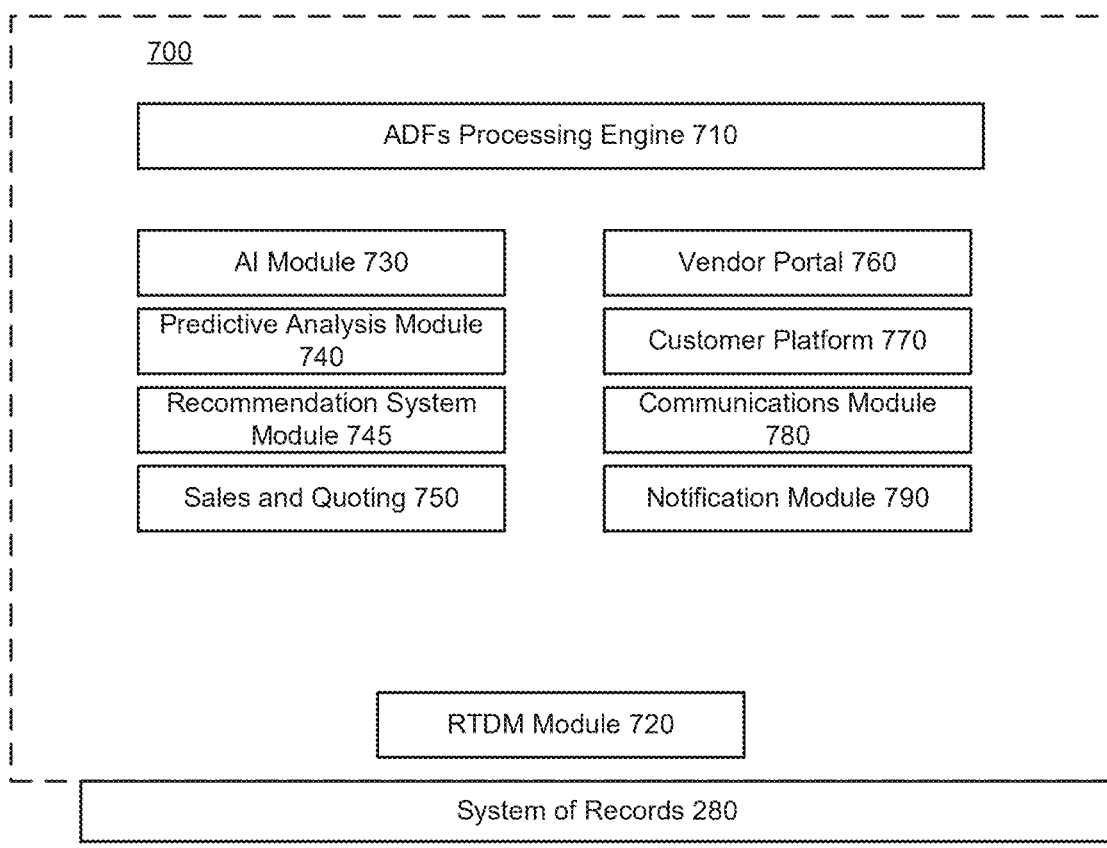
FIG. 7 illustrates a distribution network management system supporting ADFs, according to an embodiment.

FIG. 7 illustrates an embodiment that implements the distribution network management system 700 informed by the concepts detailed in the earlier embodiments, especially those described in FIGS. 4, 5, and 6. The embodiment uses its architecture to improve vendor interactions, streamline supply chain operations, and provide personalized customer experiences. The embodiment's architecture draws on the principles of the agnostic data forms (ADFs) concept and integrates the Real-Time Data Mesh (RTDM) framework discussed in FIGS. 5 and 6.

In an embodiment, ADFs Processing Engine 710 is a specialized version of ADFs Processing Engine 410. This engine is designed to receive data from multiple vendors in varying formats. Utilizing the architecture of Real-Time Data Mesh (RTDM), ADFs Processing Engine 710 standardizes and canonizes the incoming data. The data is transformed into a unified format and stored within Data Mesh 720. In a non-limiting example, Data Mesh 720 can also serve as an embodiment of RTDM module 600.

ADFs Processing Engine 710 employs a set of algorithms, including attribute matrix analysis, to facilitate the transformation of diverse data formats. These algorithms can identify correlations between unique attributes present in each vendor's data format and a predefined standardized data model. This enables the conversion of varying data formats into a canonized and standardized structure suitable for further processing or storage within Data Mesh 720.

Data Mesh 720 operates as one unconventional component of the RTDM framework, ensuring synchronized and coherent real-time data flows across different modules of the system. This synchronization gives users current and accurate information such as product catalogs, pricing, availability, order statuses, and shipping updates. The Real-Time Data Mesh (RTDM) framework can provide a backbone architecture of the ADFs system 700. Data Mesh 720, as a core element, can be configured to establish real-time synchronization and data standardization. In one example, Data Mesh 720 can include Apache Kafka for data streaming and Apache Cassandra for distributed data storage. These components can enable high throughput, fault tolerance, and low latency, ensuring that data flows across the supply chain ecosystem.

AI Module 730 is integrated into the ADFs framework and focuses on leveraging the capabilities of artificial intelligence and machine learning technologies. Within AI Module 730, Predictive Analytics Module 740 plays a significant role. This module is equipped to analyze historical data and contextual factors to accurately forecast future demand patterns. As a result, Predictive Analytics Module 740 enables businesses to make informed decisions for optimizing inventory levels and streamlining supply chain operations, thereby improving both efficiency and responsiveness. Data Mesh 720 serves as a centralized repository within the distribution network (inspired by FIG. 6). This repository stores standardized data from various vendors. More importantly, the embodiment uses the insights derived from the AI module within the RTDM architecture to augment the vendor-customer interaction within the Vendor Portal 760 and the Customer Platform 770.

Vendor Portal 760 provides vendors with an interactive interface to upload their data in various formats. This data is transformed and standardized by the ADFs Processing Engine 710 using insights gained from the RTDM architecture (similar to the discussion in FIG. 4). The Customer Platform 770 benefits from the standardized data within the Data Mesh 720 (similar to the discussion in FIG. 4). It provides customers with accurate and consistent information about products, pricing, availability, and more, enhancing their decision-making process.

Additionally, the Sales and Quoting System 750 can use standardized data to generate accurate quotes and pricing information for customers. The integration with the Data Mesh 720 ensures current data is used in generating quotes, reducing errors and promoting efficiency.

The AI-driven insights, provided by the AI Insights Module (e.g., 460) within the RTDM architecture (similar to the discussion in FIG. 4), enhance the system's capabilities. The embodiment benefits from these insights in various modules, including the Customer Platform 770, Sales and Quoting System 750, and the Vendor Portal 760. The AI insights enable the system to recommend personalized product bundles, improve inventory levels, and enhance cross-selling opportunities, ultimately improving both vendor and customer experiences.

According to some embodiments, the Agnostic Data Forms (ADFs) concept represents a technical paradigm poised to reshape the landscape of data integration in the realm of modern commerce. With a keen focus on the exchange of information between vendors and customers, the ADFs framework combines advanced technologies, including AI and machine learning, to address the longstanding challenges associated with integrating diverse vendor data formats.

Agnostic Data Forms Processing Engine 710, uses AI to navigate the variety of vendor data formats. With a focus on overcoming the complexities of disparate data structures, this engine employs algorithms, including the attribute matrix analysis, to decode vendor-specific data formats. These algorithms identify correlations between attributes unique to each vendor's format and the standardized data model, enabling the transformation of diverse data formats into a standardized structure. To optimize conversion efficiency and speed, the system integrates machine learning algorithms specifically designed to recognize and transform complex data structures into the desired agnostic format rapidly. This involves training models on a vast array of vendor-specific codes and formats, enabling the AI to predict and execute the most efficient conversion paths. Advanced neural network architectures, such as convolutional neural networks (CNNs) for pattern recognition and recurrent neural networks (RNNs) for handling sequential data, are employed to minimize processing time while maintaining high accuracy. This approach ensures that as the system encounters new or updated formats, it continuously learns and adapts, reducing the need for manual updates and interventions. In some embodiments, to enhance conversion speed, the system utilizes parallel processing techniques enabled by AI/ML. By distributing the conversion tasks across multiple processing units, the system can handle large volumes of data simultaneously, significantly reducing the overall conversion time. This is particularly useful for real-time data processing requirements, where timely access to converted data is critical. Additionally, AI algorithms optimize the allocation of resources based on the complexity and volume of incoming data, ensuring efficient utilization of computational resources. This dynamic resource allocation not only speeds up the conversion process but also optimizes energy consumption, contributing to a more sustainable operation. Machine learning models are also trained to identify bottlenecks and inefficiencies in the data conversion process, allowing for ongoing optimization of the conversion pipeline. By analyzing past conversion tasks, the AI can forecast potential challenges and adjust its strategies accordingly. This predictive capability ensures that the system not only reacts to current conditions but also proactively adapts to anticipated changes in data formats or volumes. Furthermore, the incorporation of transfer learning techniques allows models to apply knowledge gained from one conversion task to others, significantly speeding up the adaptation to new data formats with minimal additional training. This ensures that the system remains scalable and efficient, even as the diversity and complexity of data increase.

The Real-Time Data Mesh (RTDM) framework implements Data Mesh 720 as the framework, ensuring synchronized and coherent data flows. This real-time synchronization permeates across modules, equipping users with instant information encompassing product catalogs, pricing, availability, order statuses, and shipping updates. Furthermore, embodiments can use AI/ML in the ADFs framework. The AI Module 730 stands as a testament to this understanding, leveraging AI and machine learning to drive transformative outcomes. Within this module, the Predictive Analytics Module 740 rises to prominence, utilizing historical data and contextual insights to forecast demand patterns. This predictive capability provides businesses to improve inventory levels and streamline supply chain operations, improving overall efficiency and responsiveness. Central to the ADFs concept is the Agnostic Data Forms Processing Engine 710, a critical component enabled by advanced AI algorithms. In a non-limiting example, one algorithm employed can be an Attribute Matrix Analysis Algorithm, providing an exemplary data format transformation. This algorithm can incorporate natural language processing (NLP) techniques and machine learning to dissect vendor-specific data formats. Through this algorithm, the processing engine identifies key attributes, relationships, and hierarchies within the data.

In parallel, the Recommendation System Module 745 demonstrates AI-driven personalization. By integrating AI algorithms, this module provides customers with tailor-made product recommendations, enhancing customer engagement and facilitating cross-selling. This module represents the embodiment of how AI can be used to craft personalized experiences that resonate with customers on an individual level. For example, Vendor A can provide a product catalog in XML format, while Vendor B nay provide their catalog in JSON. The Attribute Matrix Analysis Algorithm can perform NLP techniques to discern agnostic semantic meanings from these formats. It recognizes attributes like "product ID," "price," "description," and others, irrespective of the format's structure. By creating a unified attribute matrix, the engine bridges vendor-specific formats and the standardized data model.

AI Module 730 can include various modules and algorithms designed for specific functionalities. In another example, AI Module 730 can include Predictive Analytics Module 740, which can employ machine learning algorithms such as time series analysis and regression models. It can utilize historical data to predict demand patterns, allowing businesses to improve inventory levels, minimize stockouts, and enhance supply chain efficiency.

For example, by analyzing historical data on product demand, seasonality, and market trends, Predictive Analytics Module 740 can forecast future demand for specific SKUs. Armed with these insights, the distributor proactively adjusts inventory levels, ensuring the availability of high-demand products while minimizing excess stock.

The Recommendation System Module 745, which can be implemented in or operatively connected to AI Module 730, can be configured to integrate advanced recommendation algorithms like collaborative filtering and content-based filtering. Recommendation System Module 745 can examine customer preferences, historical purchases, and browsing behavior to offer personalized product recommendations. As an illustrative case, a platform can utilize the respective modules to tailor suggestions based on a customer's past purchases and interests, improving engagement and augmenting cross-selling opportunities.

To further improve engagement and collaboration, the ADFs concept uses the Communication Module 780 and the Notification Module 790. In a non-limiting example, Communication Module 780 can implement WebSocket for bidirectional communication and GraphQL for efficient data querying. These technologies enable users to access accurate and up-to-date information in real time, enhancing informed decision-making and collaborative interactions.

In some embodiments, the ADFs framework enables a vendor to upload product data in a native format. ADFs Processing Engine 710, utilizing one or more algorithms such as Attribute Matrix Analysis Algorithm, or other appropriate algorithms deciphers the format in real-time or near real-time, converting it into a standardized, canonical structure.

Simultaneously, the Data Mesh 720 performs operations to ensure that this information is disseminated across the supply chain or distribution ecosystem. The Predictive Analytics Module 740 assesses the impact of the new information and/or SKUs on demand patterns and inventory levels, providing users with data-driven insights. Meanwhile, the Recommendation System Module 745 integrates the SKU into personalized customer recommendations, boosting the likelihood of cross-sales.

The Communication Module 780 facilitates immediate updates to users, ensuring that all parties are informed of the SKU addition. The Notification Module 790 enhances this by issuing real-time alerts regarding critical events, such as stock replenishments or order fulfillment milestones.

Crucial to the ADFs framework is the Communication Module 780, a dynamic facilitator of interactions among users. This module ensures real-time communication, fostering agile decision-making and collaboration. Amplifying this communicative prowess, the Notification Module 790 ushers in a proactive dimension, offering real-time alerts pertaining to critical events and updates within the supply chain. This integration improves real-time communication and responsiveness.

In Embodiments of ADFs system 700, the ADFs framework uses algorithms and the described Data Mesh to achieve efficient data integration and transformation. The framework uses algorithms, including AI, to solve data integration problems, by standardizing vendor-specific data formats and enhancing distribution operations. Vendors and distribution platforms adopting the ADFs framework are enabled to significantly alter traditional commerce methods.

Practical use of the ADFs framework results in measurable improvements in distribution management. The associated platforms achieve rapid vendor onboarding, lower integration costs, and improved customer experiences. The outcomes have demonstrated that the framework effectively standardizes data and optimizes operations. The ADFs framework is scalable and can be used in different industries for data integration. This suggests that businesses can establish ecosystems that are both collaborative and efficient.

ADFs also focus on real-time data standardization by utilizing artificial intelligence and other advanced technologies. This addresses the complexity of integrating various data formats and allows for improved interactions between vendors and customers. Additionally, it enables more efficient supply chain operations and customized customer experiences. The framework changes how business data is integrated and promotes collaboration.

Figure 8:
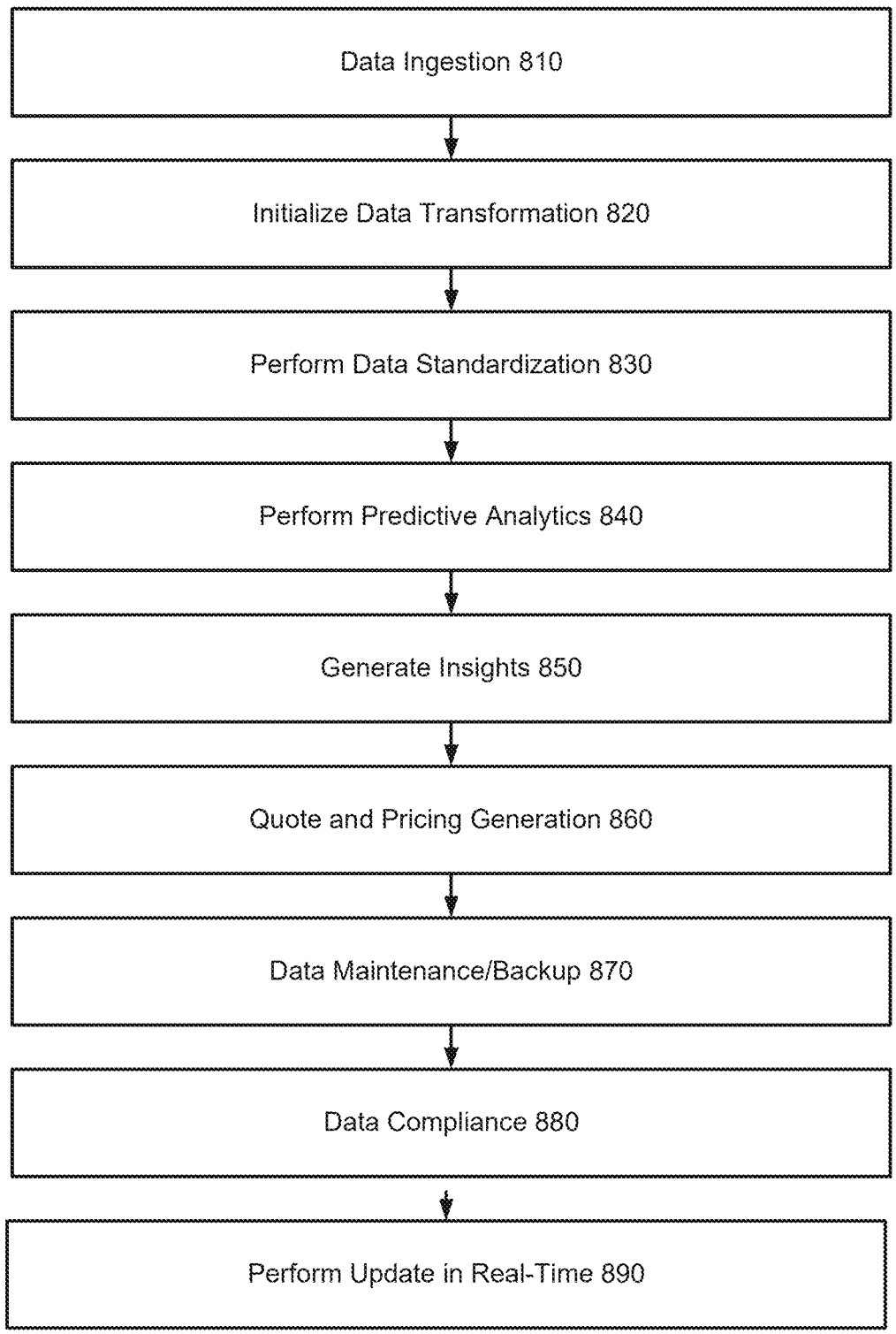
FIG. 8 is a flow diagram of a method for managing ADFs, according to an embodiment.

FIG. 8 illustrates an embodiment of a Process 800 that implements the distribution network management system as described above, especially those described in FIGS. 4 to 7. Process 800 begins at Operation 810, wherein ADFs Processing Engine 710 receives native data from multiple vendors. In this operation, the raw data formats range from JSON to XML and CSV files. These data streams are funneled through a data ingestion pipeline that validates the received data based on pre-defined schema and integrity checks.

Operation 820 involves the initialization of data transformation algorithms within ADFs Processing Engine 710. Specifically, these algorithms utilize attribute matrix analysis, along with pattern recognition techniques. The algorithms map native attributes in the vendor-specific data to a predefined canonical data model. The objective is to standardize the different data attributes into a canonical form that is agnostic to the vendor or origin.

In Operation 830, the transformed data undergoes a standardization process. Data Mesh 720 serves as the central repository where the standardized data is stored. Various technologies, such as Apache Kafka for data streaming and Apache Cassandra for data storage, can be integrated into Data Mesh 720. This ensures that the standardized data is available for real-time access and is uniformly disseminated across the system modules, which include Vendor Portal 730 and Customer Platform 740.

Operation 840 involves AI Module 780, particularly the Predictive Analytics Module 790. This module processes the standardized data to generate predictive analytics models. These models help in forecasting demand, predicting consumer behavior, and generating insights on inventory turnover rates.

Operation 850 is focused on actionable insight generation. AI algorithms analyze the standardized and predictive data to formulate actionable insights. These insights are used to customize vendor-customer interactions in Vendor Portal 730 and Customer Platform 740. They are also used to enhance operational efficiency in warehousing and supply chain management, represented by Supply Chain Operations 760.

Operation 860 involves Sales and Quoting System 750, which utilizes the standardized data to generate quotes and set pricing levels. This system integrates real-time pricing algorithms that are sensitive to market trends, seasonal variations, and specific customer preferences.

Operation 870 executes a data backup operation. Periodically, the standardized data is archived in Backup Storage 770 to ensure data integrity and provide a contingency plan for data recovery.

Operation 880 involves Audit and Compliance Module 785. This module performs real-time compliance checks on the standardized data to ensure that it adheres to legal and business policy guidelines.

Operation 890 performs data updating in real-time. Whenever a change or an addition occurs in vendor-specific data, the entire series of steps from Operation 810 to Operation 880 are reinitiated, to update the canonical data forms within Data Mesh 720. This ensures that the most current and accurate data is used across all modules. Operation 890 can additionally include final verification is carried out (for example, by a Quality Assurance Module). Final verification confirms that all operations have been completed accurately and that the standardized data is in its finalized form, ready for downstream utilization across different business operations.

Process 800 serves as a mechanism for ingesting native, vendor-specific data and transforming it into canonical, agnostic data forms. These standardized data forms are then standardized, analyzed, and utilized across various system modules to facilitate real-time decision-making, improve vendor-customer interactions, streamline supply chain operations, and generate actionable insights for enhanced operational efficiency. Through the integration of multiple technologies and algorithms, Process 800 ensures a robust, efficient, and scalable data transformation and utilization platform.

Figure 9:
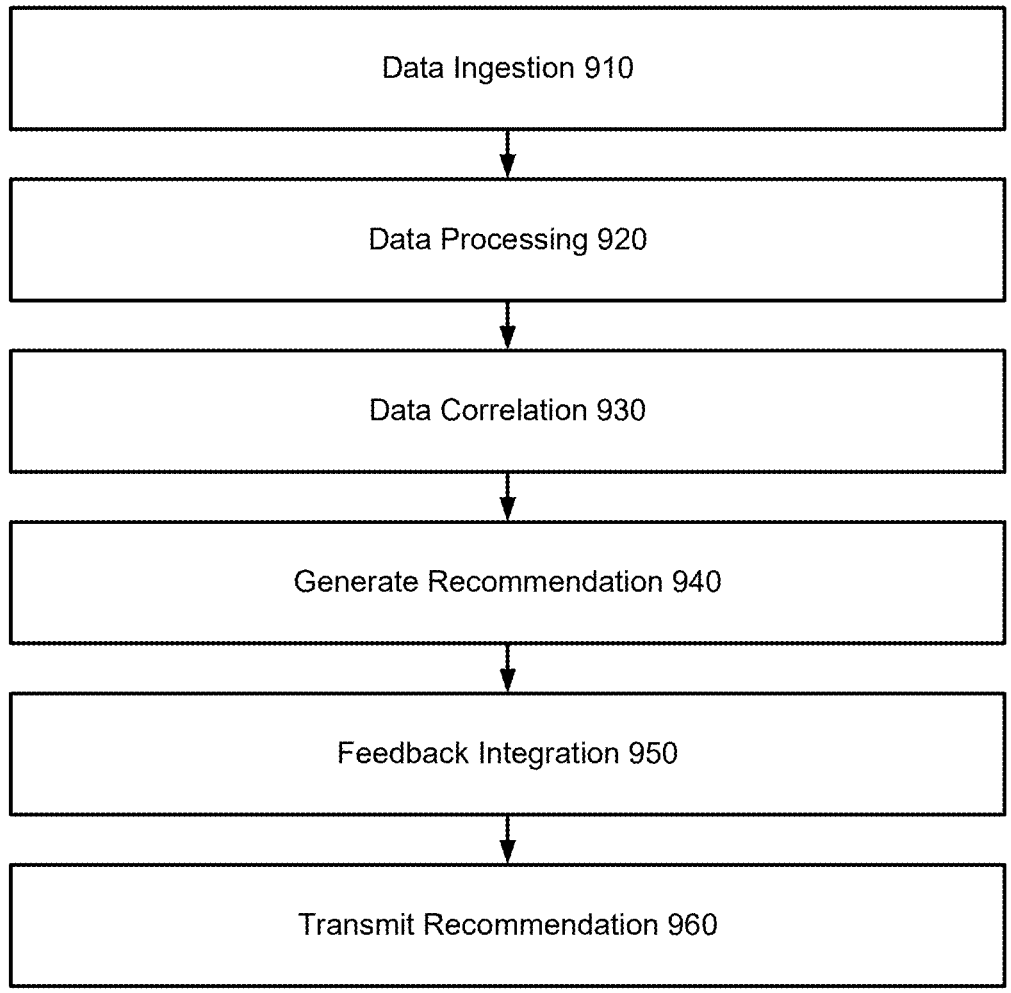
FIG. 9 is a flow diagram of a method for vendor onboarding using the SPoG UI, according to some embodiments of the present disclosure.

FIG. 9 illustrates an embodiment of a Process 900 that implements recommendations based on the distribution network management system as described above, especially those described in FIGS. 4 to 8. Process 900 represents the operations carried out by the Recommendation System Module 792, part of or operatively connected to AI Module 780. This module utilizes advanced algorithms to offer customers personalized product recommendations. The module receives standardized data from Data Mesh 720 and performs a series of steps to generate these recommendations. It primarily works in concert with Predictive Analytics Module 790 and the ADFs Processing Engine 710.

In an embodiment, Process 900 commences with data ingestion Operation 910, where Recommendation System Module 900 collects historical data on customer interactions, purchases, and preferences from Data Mesh 720. This data is in a standardized format, standardized by ADFs Processing Engine 710, which ensures its compatibility with the Recommendation System Module 792.

Operation 920 then involves the processing of this data. Specifically, advanced machine learning algorithms such as collaborative filtering and content-based filtering can be applied. These algorithms can analyze the standardized data to discern patterns and preferences that may not be readily apparent. For instance, they can identify that customer who bought Product A also frequently purchased Product B.

In Operation 930, the module correlates this data with real-time customer interactions. As a customer browses the Customer Platform 740, the Recommendation System Module 900 dynamically adjusts the recommendations based on the customer's current behavior and historical data. For example, if a customer looks at a particular type of laptop, the system might recommend matching accessories or software based on similar customer behavior and historical data.

Operation 940 involves the generation of personalized product recommendations. These recommendations are not static; they evolve in real-time as more data is collected and processed. These are then sent to the Customer Platform 740 for display.

In Operation 950, feedback loops are integrated. If a customer clicks on a recommendation, that information is fed back into Data Mesh 720. This continuous updating helps refine future recommendations and contributes to system-wide learning, improving the effectiveness of not only the Recommendation System Module 900 but also of other interconnected systems like Predictive Analytics Module 790.

Finally, Operation 960 involves the dissemination of these recommendations through various channels. This can be within the Customer Platform 740, or as targeted promotions sent via the Communication Module 796 and Notification Module 798. These modules could use technologies like WebSocket and GraphQL for real-time updates.

In a non-limiting example, the standardized data can be in JSON format, simplified for immediate processing by the algorithms. Operation 920 could use Apache Spark for large-scale data processing. Apache Kafka could be used to stream real-time data to the Recommendation System Module 900, ensuring real-time adaptability of recommendations.

Process 900 is designed to enhance customer engagement by providing accurate and personalized product recommendations. This process utilizes a variety of advanced algorithms and real-time data processing techniques, ensuring its effectiveness and adaptability.

Figure 10:
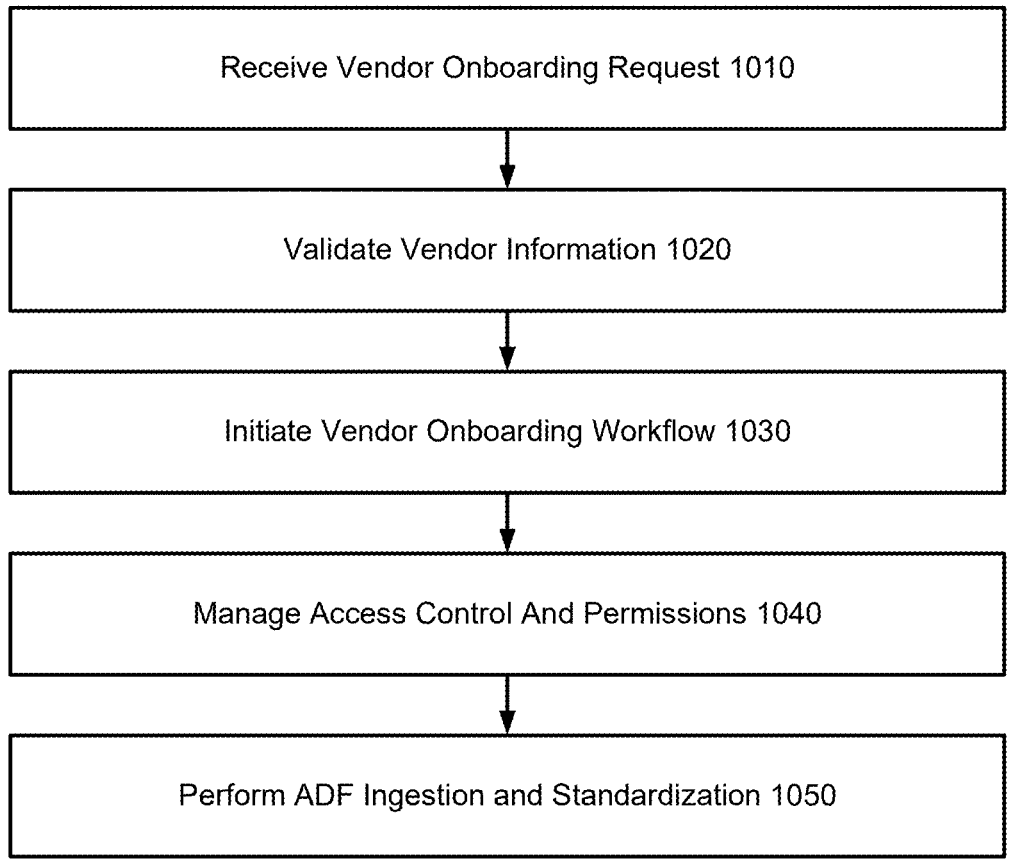
FIG. 10 is a flow diagram of a method for vendor onboarding using the SPoG UI, according to some embodiments of the present disclosure.

FIG. 10 is a flow diagram of a method 1000 for vendor onboarding using the SPoG UI, according to some embodiments of the present disclosure. In some embodiments, method 1000 outlines a streamlined and efficient process that uses the capabilities of the SPoG UI to facilitate the onboarding of vendors into the distribution ecosystem. By integrating real-time data, collaborative decision-making, and role-based access control functionalities, the SPoG UI enables users to effectively manage and optimize the vendor onboarding process. Based on the disclosure herein, operations in method 1000 can be performed in a different order and/or vary to suit specific implementation requirements.

At operation 1010, the process is initiated when a vendor expresses interest in joining the distribution ecosystem. The computing device, utilizing the SPoG UI, receives the vendor's information and relevant details. This can include company profiles, contact information, product catalogs, certifications, and any other pertinent data required for the vendor onboarding process.

At operation 1020, the computing device validates the vendor's information using integration capabilities with the Real-Time Data Exchange Module. By leveraging real-time data synchronization with external systems, the computing device ensures that the vendor's details are accurate and current. This validation step helps maintain data integrity, minimizes errors, and establishes a reliable foundation for the vendor onboarding process.

At operation 1030, the computing device initiates the vendor onboarding workflow through the Collaborative Decision-Making Module. This module allows users involved in the onboarding process, such as procurement officers, legal teams, and vendor managers, to collaborate and make informed decisions based on the vendor's information. The SPoG UI facilitates communication, file sharing, and workflow initiation, enabling users to collectively assess the vendor's suitability and efficiently progress through the onboarding steps.

At operation 1040, the computing device employs the Role-Based Access Control (RBAC) Module to manage access control and permissions throughout the vendor onboarding process. The RBAC Module ensures that users only have access to the specific information and functionalities necessary for their roles. This control mechanism protects sensitive data, maintains privacy, and aligns with regulatory requirements. Authorized users can securely review and contribute to the vendor onboarding process, fostering a transparent and compliant environment.

At Operation 1050, ADFs Processing Engine 710 can receive raw data from various vendors. Data formats may include JSON, XML, and CSV, in non-limiting examples. Initial validation can be performed against a predefined schema and integrity checks. Operation 1050 can include performing one or more data transformation algorithms. These algorithms can utilize attribute matrix analysis and pattern recognition techniques to map vendor-specific attributes to a canonical data model. Operation 1050 transforms diverse data into a uniform format that is vendor-agnostic.

In an embodiment, the transformed data can be transmitted (e.g., moved or copied) to Data Mesh 720 for storage. Here, integration with technologies like Apache Kafka for data streaming and Apache Cassandra for data storage can be performed. This allows for real-time data access and uniform dissemination across Vendor Portal 730 and Customer Platform 740.

Additionally, Predictive Analytics Module 790 can process standardized data to develop predictive analytics models, which are then used for various analytics purposes such as forecasting demand and consumer behavior. Actionable insights can also be generated through AI algorithms and used across different system modules like Vendor Portal 730 and Customer Platform 740. Furthermore, Sales and Quoting System 750 can utilize the standardized data for real-time pricing based on market trends and customer preferences.

At Operation 1050 (or in additional operations), Backup Storage 770 can periodically archive the data to ensure its integrity. Audit and Compliance Module 785 can perform real-time compliance checks. Any updates or changes in the vendor-specific data trigger a re-initiation of the entire series from Process 1050 to ensure the data remains current and accurate. Quality Assurance may conduct verification to confirm the data's readiness for downstream use.

Figure 11:
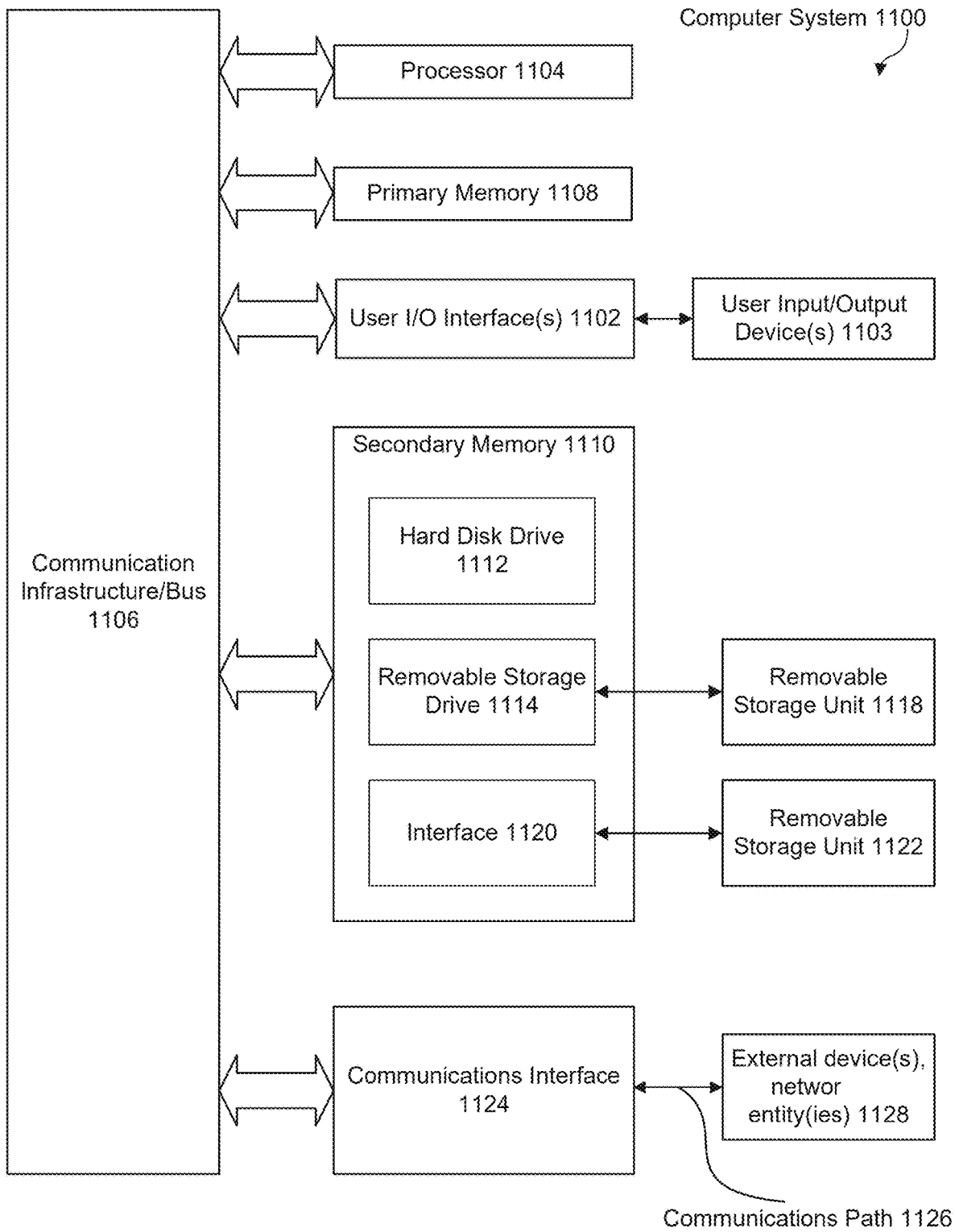
FIG. 11 is a block diagram of example components of device, according to some embodiments of the present disclosure.

FIG. 11 is a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random-access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Figure 12A:
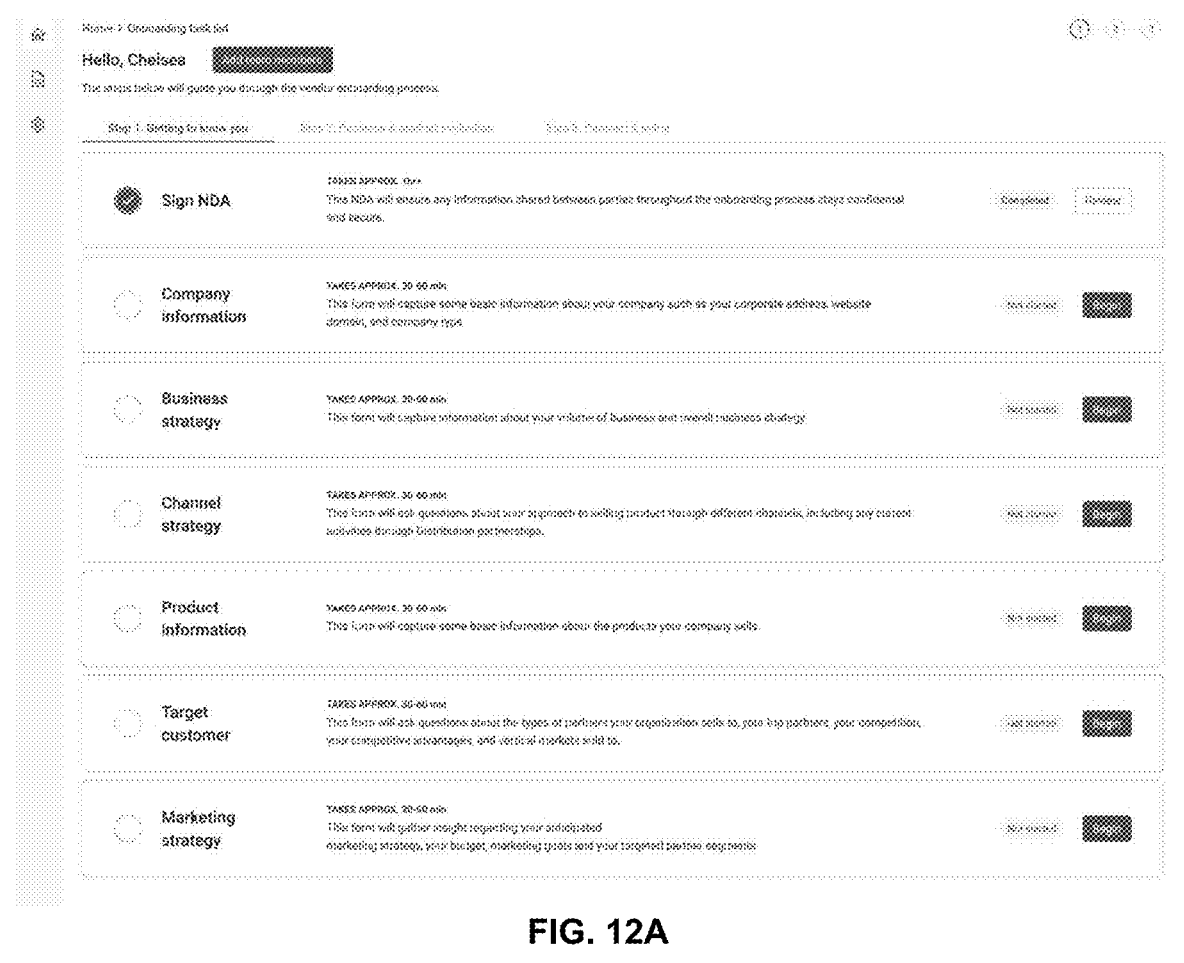
Figure 12B:
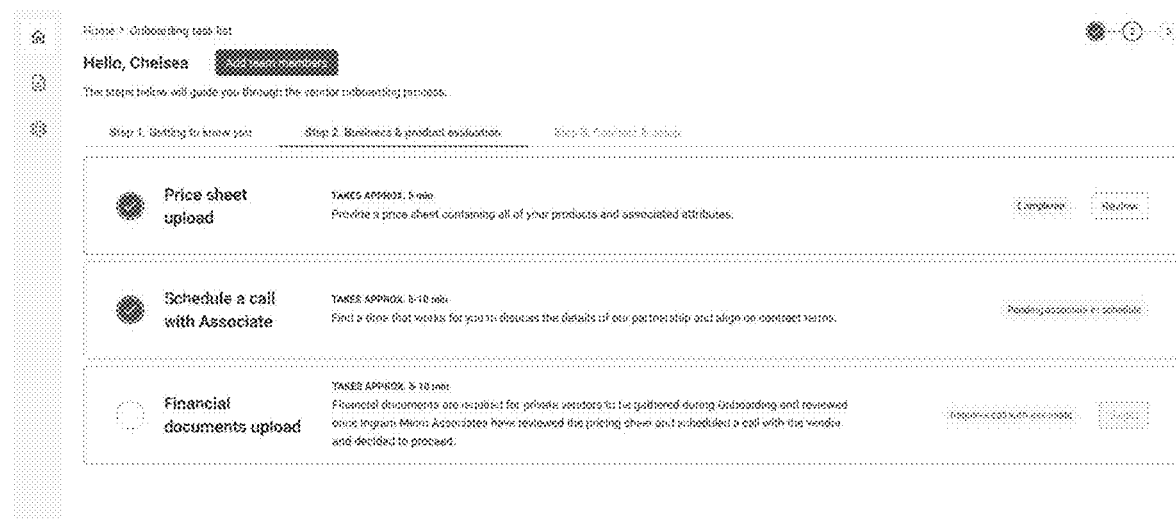
FIGS. 12A to 12Q depict various screens and functionalities of the SPoG UI, according to some embodiments.
Figure 12C:
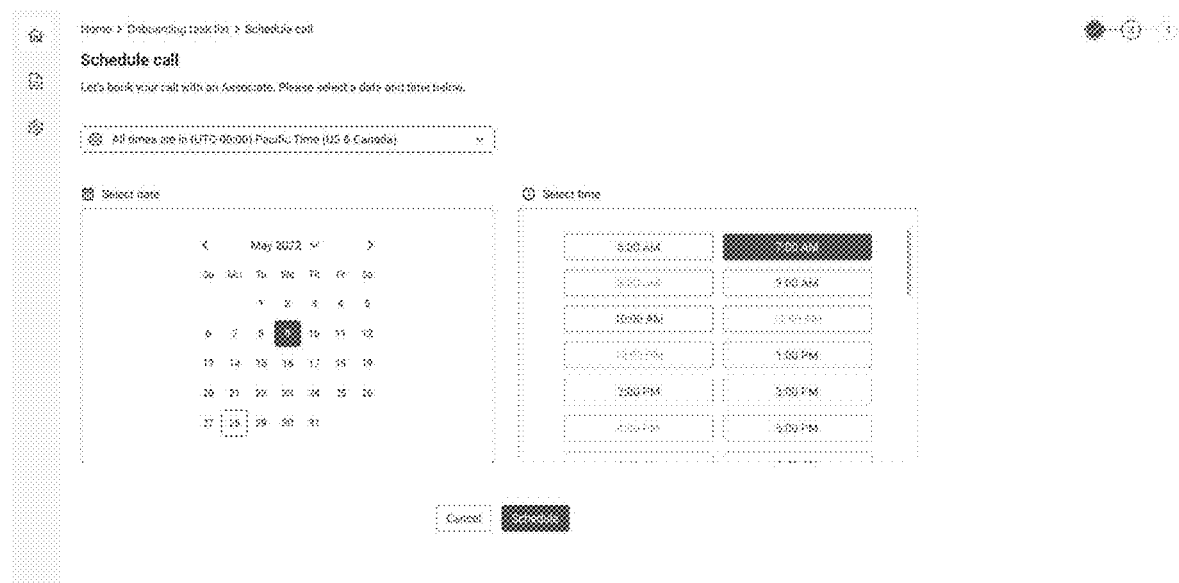
Figure 12D:
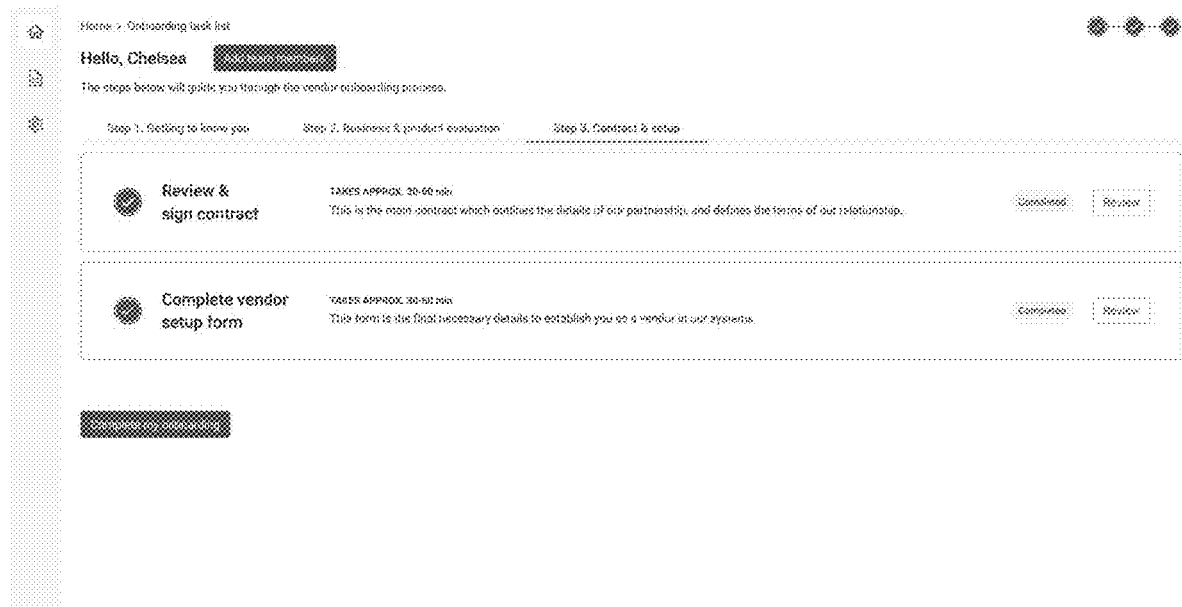
Figure 12E:
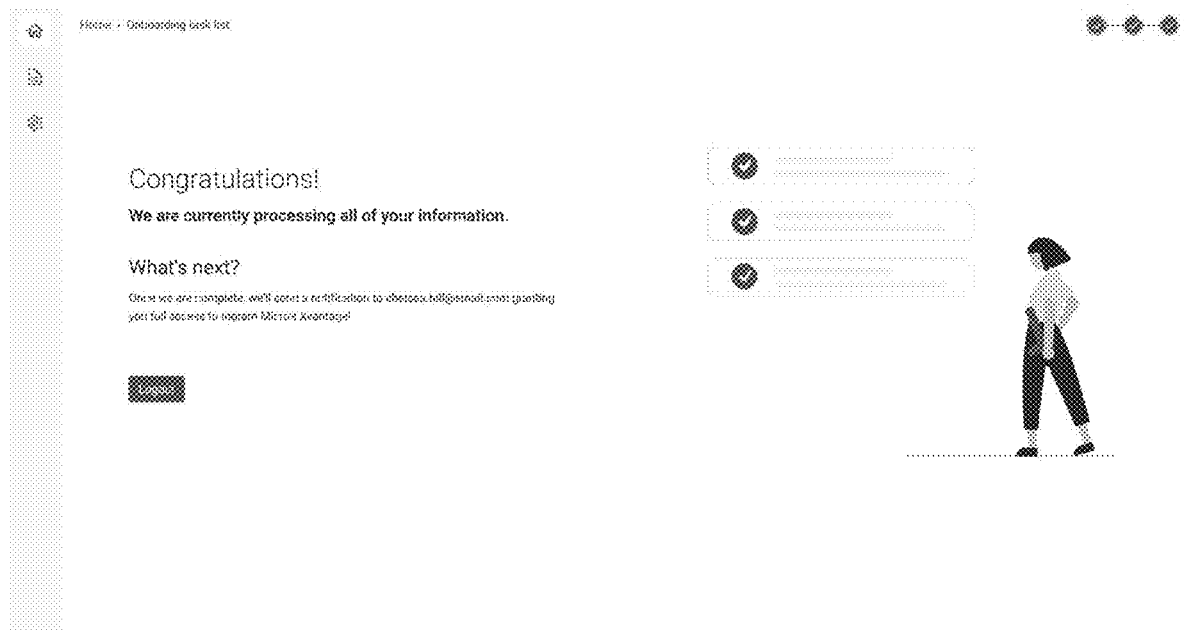
Figure 12F:
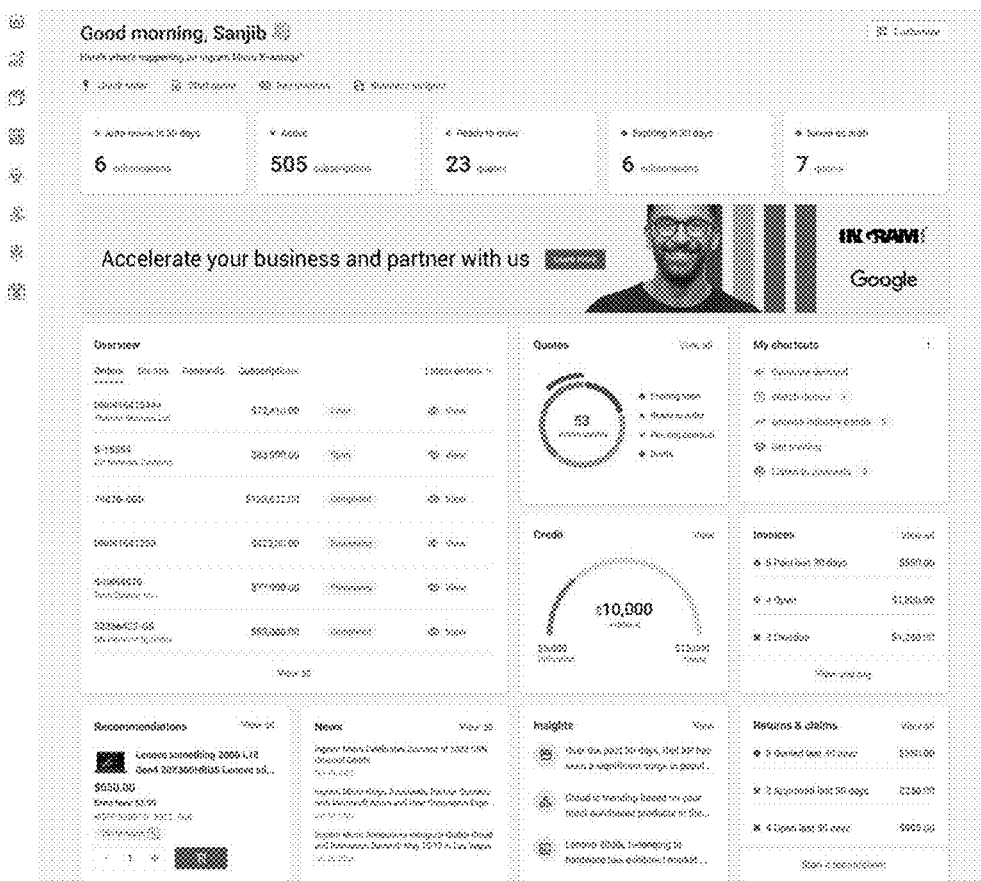
Figure 12G:
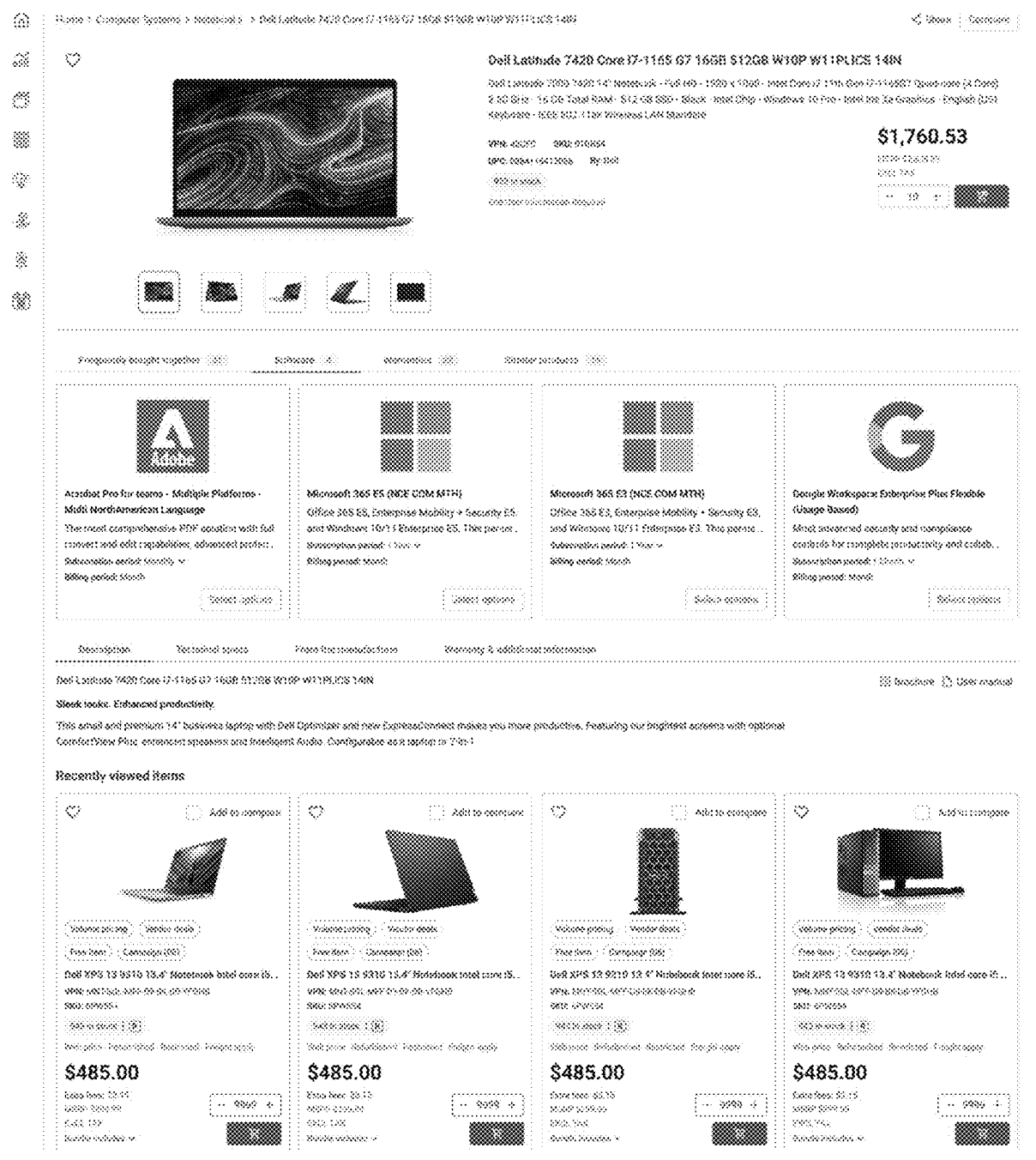
Figure 12H:
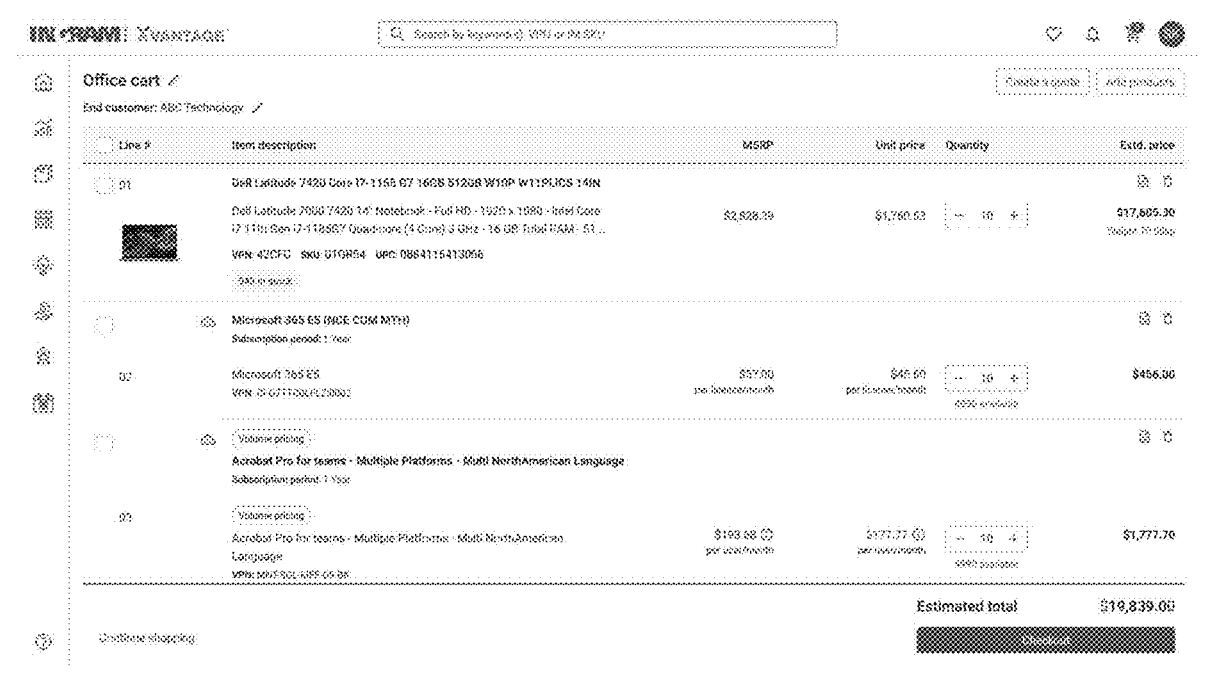
Figure 12I:
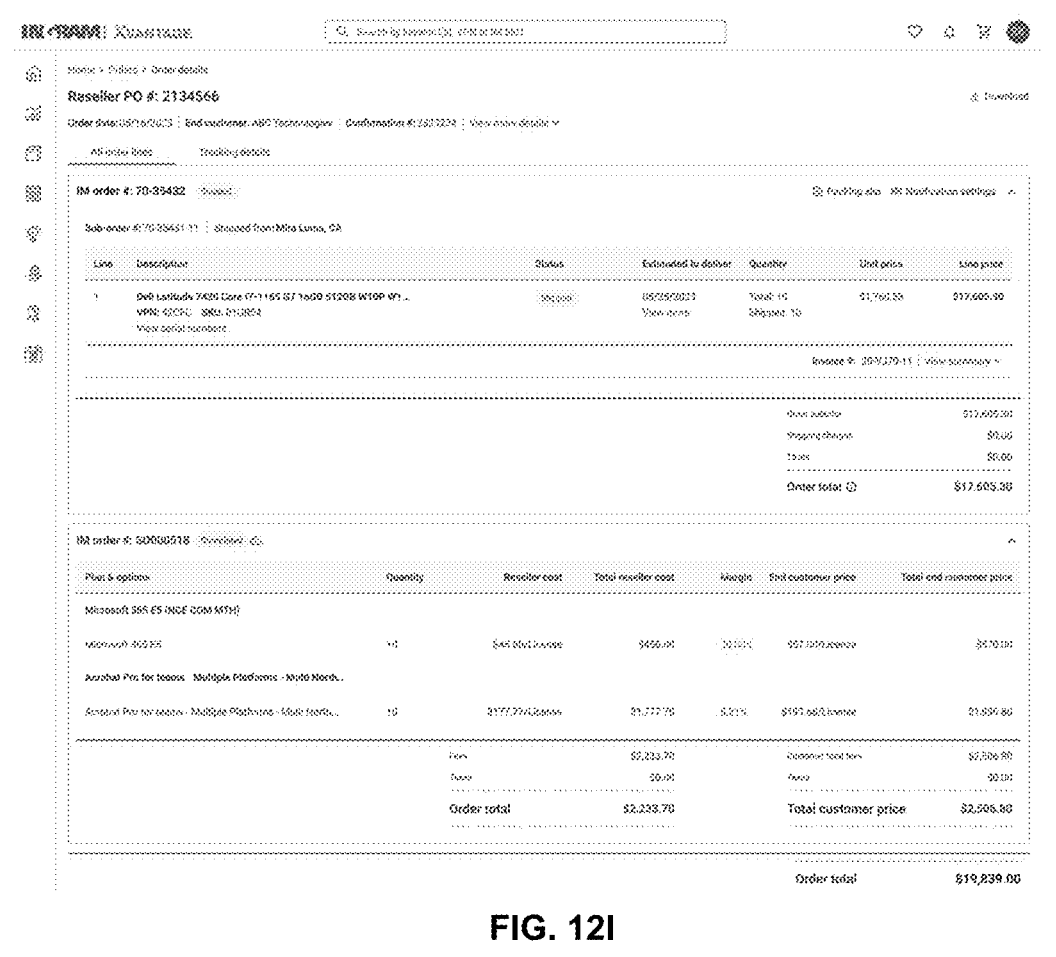
Figure 12J:
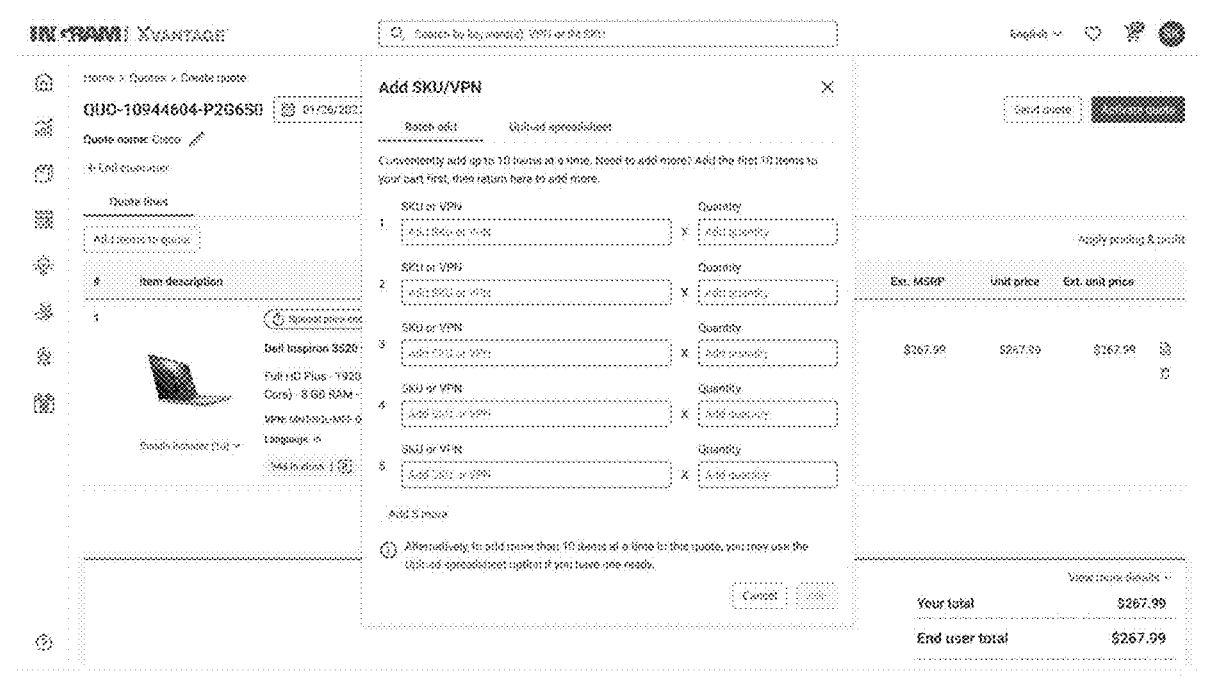
Figure 12K:
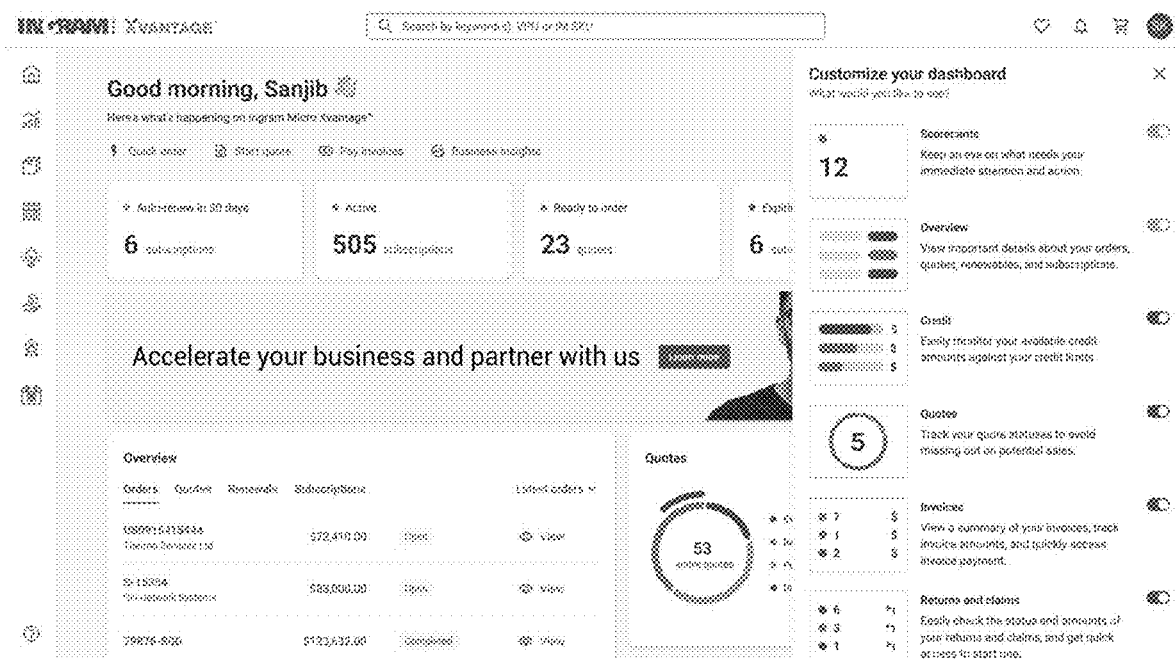
Figure 12L:
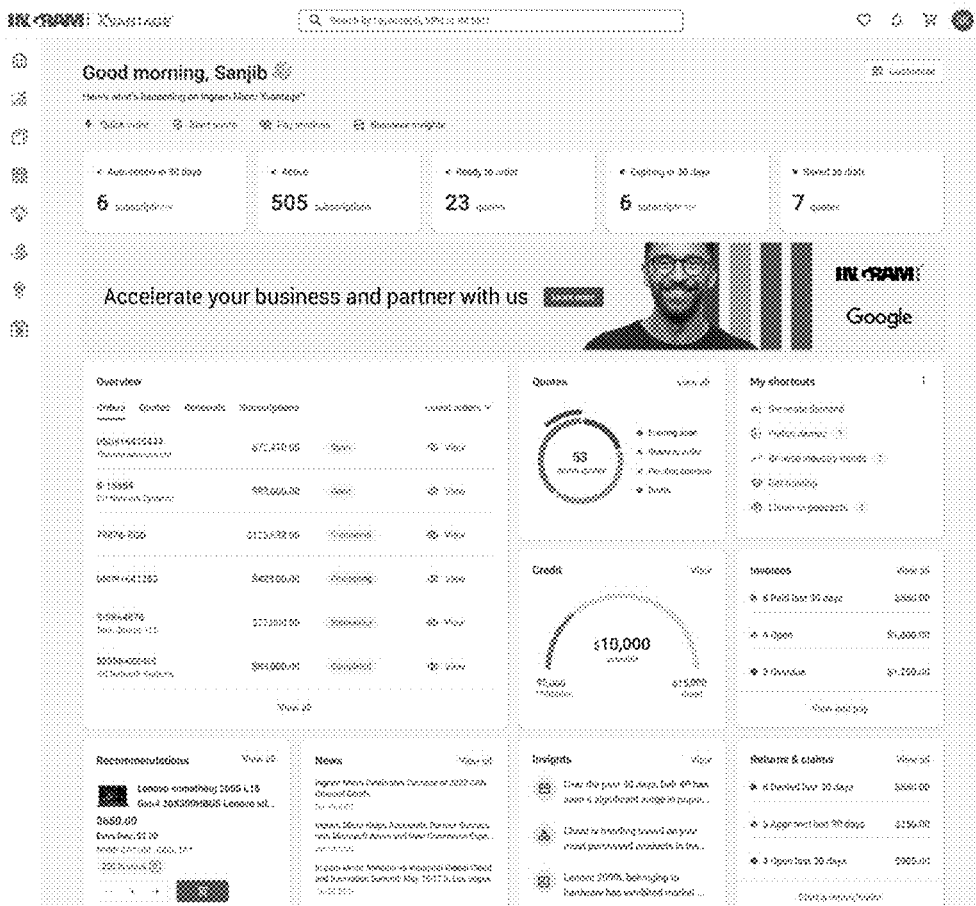
Figure 12M:
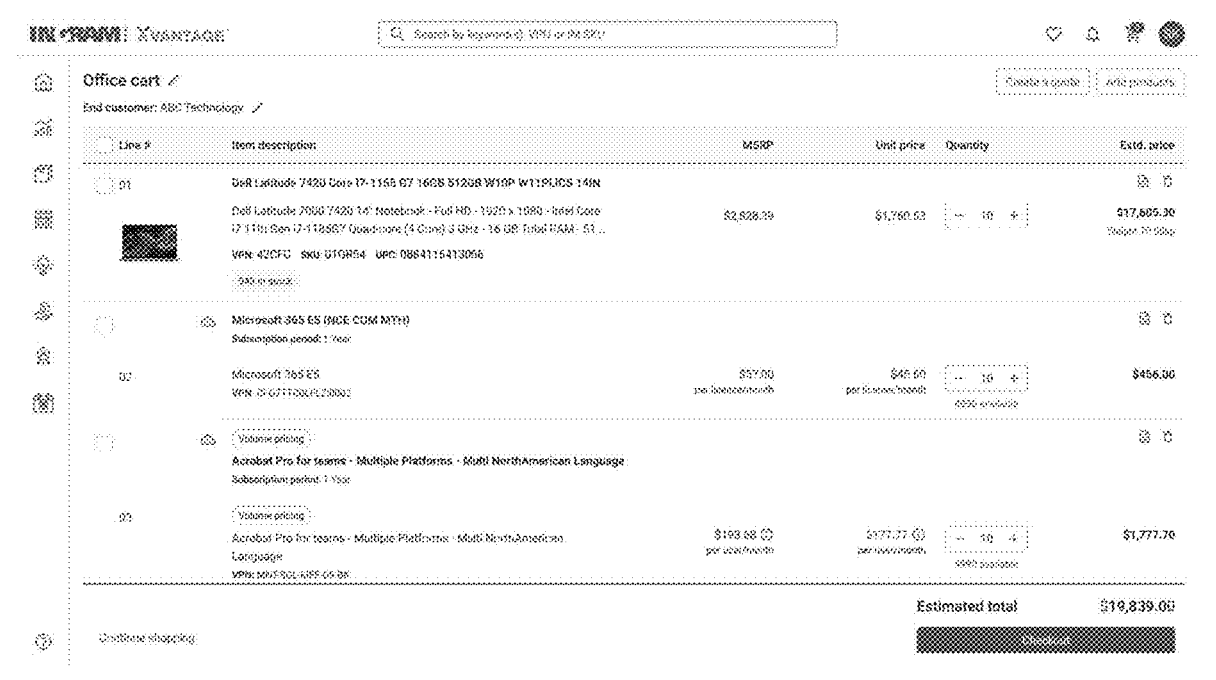
Figure 12N:
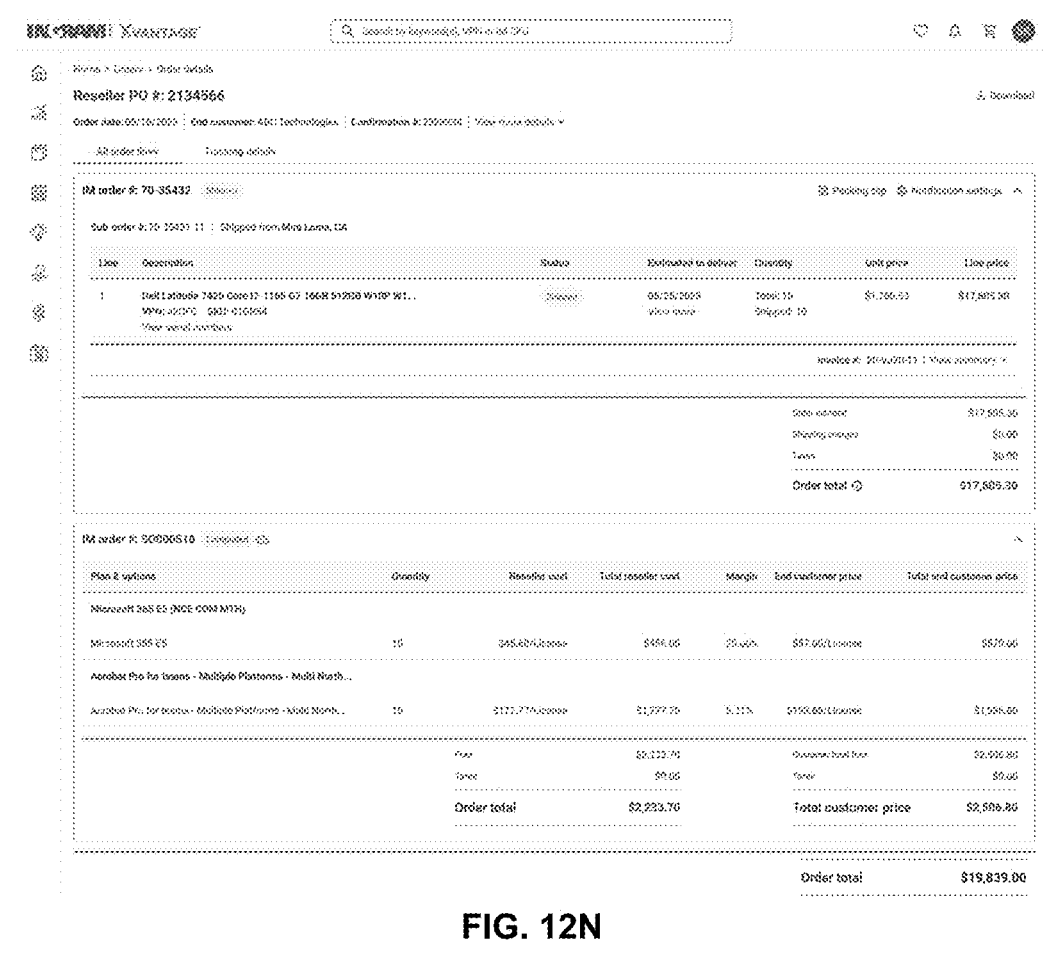
Figure 12O:
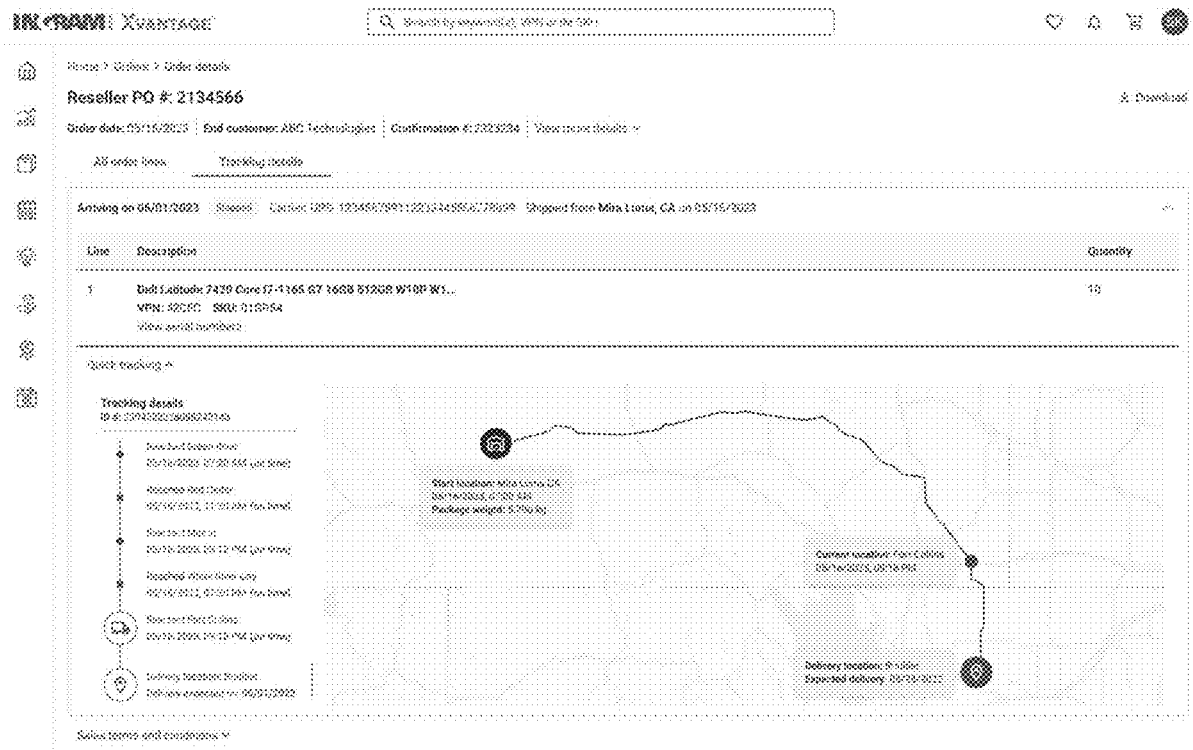
Figure 12P:
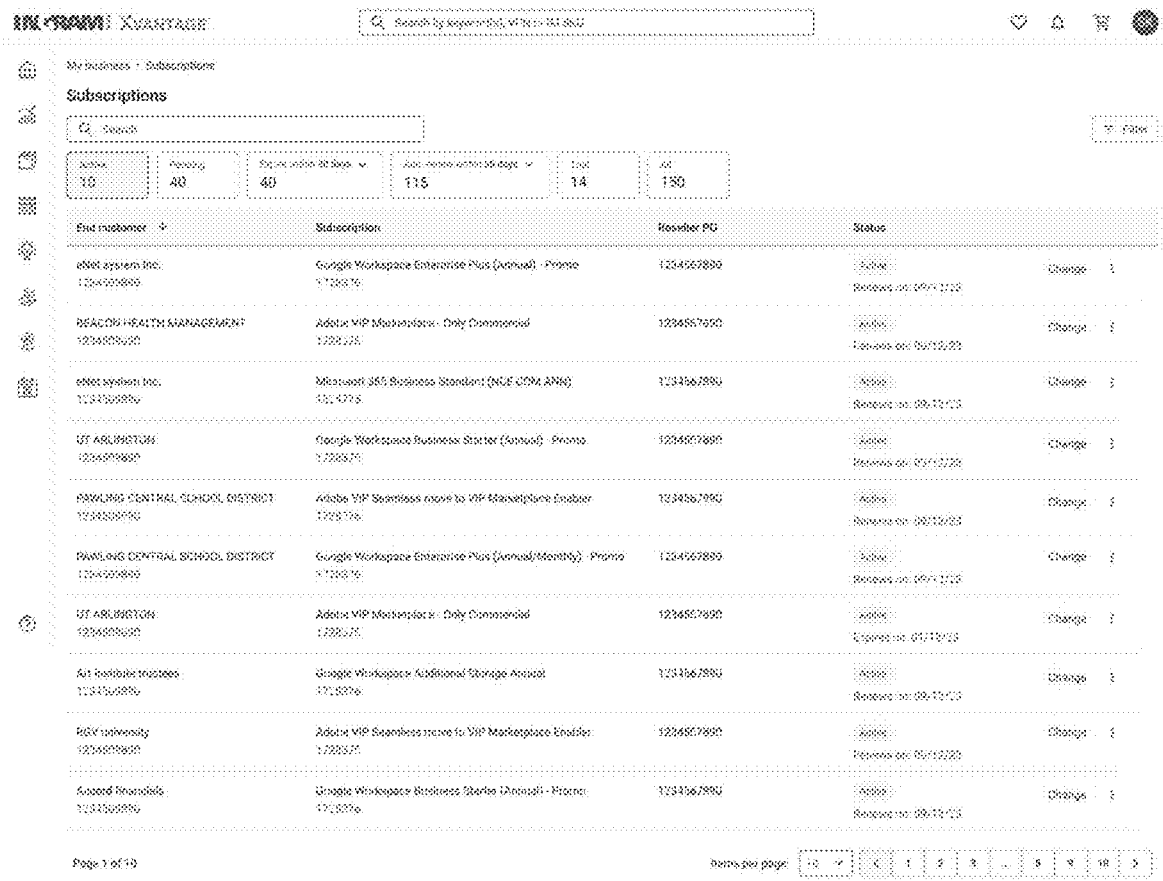
Figure 12Q:
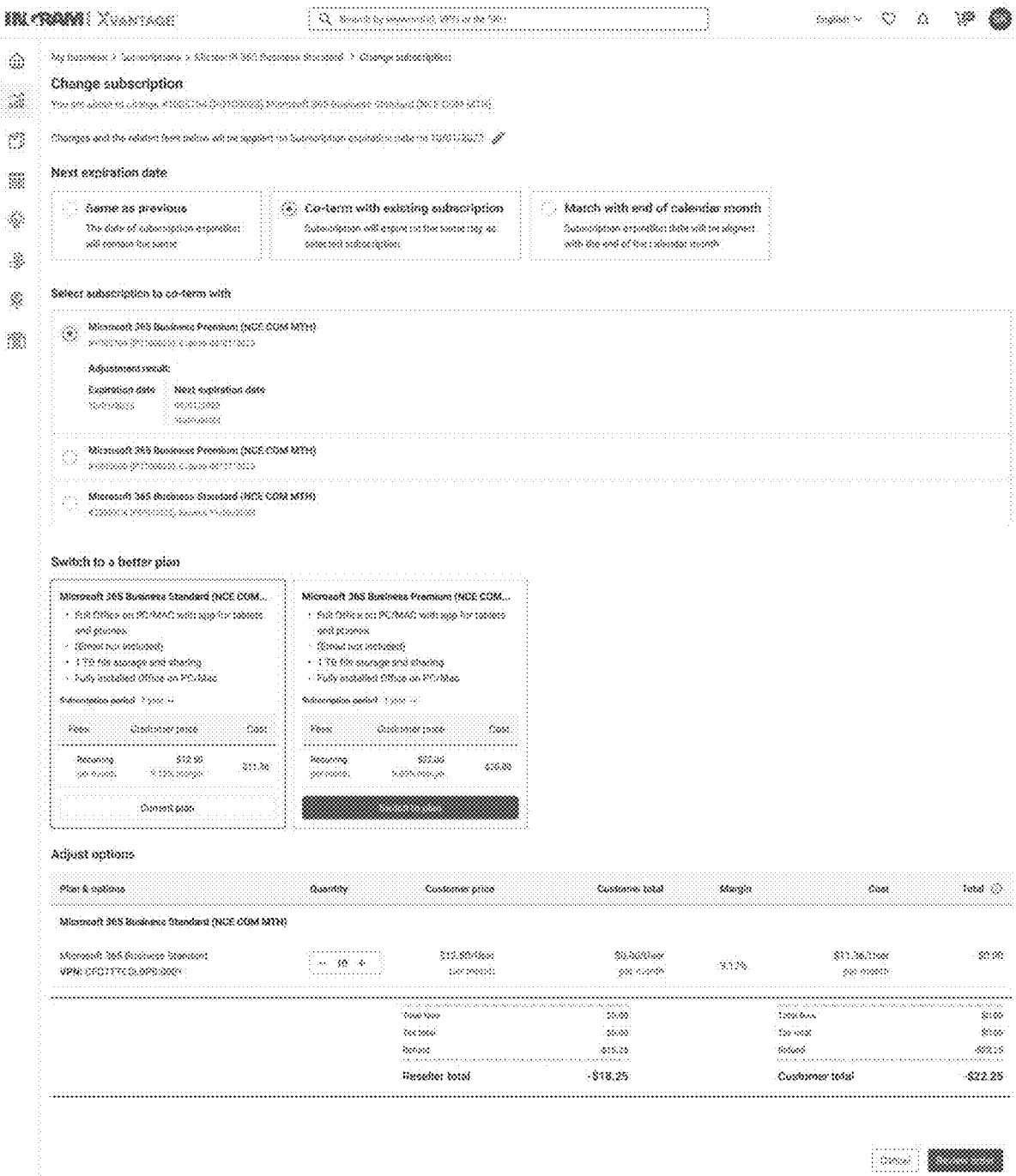

FIGS. 12A to 12Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 12A depicts a Vendor Onboarding Initiation screen that represents the initial step of the vendor onboarding process. It provides a form or interface where vendors can express their interest in joining the distribution ecosystem. Vendors can enter their basic information, such as company details, contact information, and product catalogs.

FIG. 12B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

FIG. 12C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 12D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

FIG. 12E depicts a Vendor Onboarding Completion Screen that confirms the successful completion of the vendor onboarding process. It may display a congratulatory message or summary of the completed tasks, indicating that the vendor is now officially onboarded into the distribution ecosystem.

FIG. 12F depicts a Partner Dashboard that offers partners or users a centralized view of relevant information and metrics related to their partnership with the distribution ecosystem. It provides an overview of performance indicators, key data points, and actionable insights to facilitate effective collaboration and decision-making.

FIG. 12G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 12H depicts a Customer Subscription Cart that allows customers to manage their subscription-based purchases. It displays the selected subscription plans, pricing, and duration. Customers can review and modify their subscription details before finalizing their choices.

FIG. 12I depicts a Customer Order Summary that provides a summary of the customer's order, including details such as the products or subscriptions purchased, quantities, pricing, and any applied discounts or promotions. It allows customers to review their order before confirming the purchase.

FIG. 12J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

FIGS. 12K and 12L depicts Dashboard Order Summary to display summarized information about orders placed within the distribution ecosystem. They present key order details, such as order number, customer name, product or subscription information, quantity, and order status. The dashboard provides an overview of order activity, enabling users to track and manage orders efficiently.

FIG. 12M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 12N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

FIG. 12O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 12P depicts a Customer Subscription History, which presents a historical record of the customer's subscription activities. It displays a list of previous subscriptions, including the subscription plan, duration, and status. Customers can review their subscription history, track past payments, and refer to previous subscription details.

FIG. 12Q depicts a Customer Subscription Modifications dialog, which allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 12A to 12Q collectively represent the diverse functionalities and features offered by the SPoG UI, providing users with a comprehensive and user-friendly interface for vendor onboarding, partnership management, customer interaction, order management, subscription management, and tracking within the distribution ecosystem.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A computer-implemented for data integration and transformation, the method comprising:
　　receiving native data from multiple vendors via a Processing Engine;
　　initializing data transformation algorithms in the Processing Engine, wherein the algorithms utilize attribute matrix analysis and pattern recognition techniques to map native attributes to a predefined canonical data model;
　　storing transformed data in a Data Mesh that serves as a central repository, wherein various technologies for data streaming and data storage can be integrated;
　　utilizing an AI Module, specifically a Predictive Analytics Module, to process the stored data to generate predictive analytics models for forecasting demand and consumer behavior;
　　generating actionable insights based on the predictive analytics models, wherein the insights are used to customize interactions on Vendor and Customer Platforms and to enhance operational efficiency in supply chain management;

utilizing a Sales and Quoting System to generate quotes and set pricing levels using the stored transformed data, the system incorporating real-time pricing algorithms;

archiving the stored data in a Backup Storage periodically to ensure data integrity and provide a contingency plan for data recovery; and updating the stored data in real-time to reflect changes or additions in vendor-specific data.

2. The computer-implemented method of claim 1, further comprising a data ingestion operation that validates the received data based on pre-defined schema and integrity checks.

3. The computer-implemented method of claim 1, wherein the AI Module further comprises a Recommendations System Module that utilizes advanced algorithms to offer customers personalized product recommendations based on standardized data.

4. The computer-implemented method of claim 1, wherein the Sales and Quoting System incorporates real-time pricing algorithms that are sensitive to market trends, seasonal variations, and specific customer preferences.

5. The computer-implemented method of claim 1, further comprising performing real-time compliance checks on the stored data via an Audit and Compliance Module to ensure adherence to legal and business policy guidelines.

6. The computer-implemented method of claim 1, wherein the Predictive Analytics Module utilizes machine learning algorithms to process the stored data and generate predictive analytics models.

7. The computer-implemented method of claim 1, wherein the actionable insights are used to enhance operational efficiency in areas selected from a group consisting of warehousing, supply chain management, and customer service.

8. The computer-implemented method of claim 1, wherein the native data comprises formats selected from a group consisting of JSON, XML, and CSV.

9. A data integration and transformation system comprising:
an ADFs Processing Engine configured to receive native data from multiple vendors, and to initialize data transformation algorithms to map native attributes to a predefined canonical data model;
a Data Mesh configured to serve as a central repository for storing standardized data, said Data Mesh being operable with technologies including Apache Kafka for data streaming and Apache Cassandra for data storage;
an AI Module comprising a Predictive Analytics Module configured to process the standardized data to generate predictive analytics models;
a Vendor Portal and a Customer Platform configured to use actionable insights based on the standardized data to customize vendor-customer interactions;
a Supply Chain Operations module configured to use the actionable insights to enhance operational efficiency; and
a Sales and Quoting System configured to utilize the standardized data to generate quotes and set pricing levels.

10. The system of claim 9, wherein the ADFs Processing Engine utilizes attribute matrix analysis and pattern recognition techniques as part of the data transformation algorithms.

11. The system of claim 9, wherein the Data Mesh provides real-time access to the standardized data, which is uniformly disseminated across the Vendor Portal and Customer Platform.

12. The system of claim 9, wherein the Predictive Analytics Module is further configured to generate insights on inventory turnover rates.

13. The system of claim 9, further comprising a Sales and Quoting System that integrates real-time pricing algorithms sensitive to market trends, seasonal variations, and specific customer preferences.

14. The system of claim 9, further comprising:
a Backup Storage configured to archive the standardized data; and
an Audit and Compliance Module configured to perform real-time compliance checks on the standardized data.

15. The system of claim 14, wherein the Backup Storage periodically archives the standardized data to provide a contingency plan for data recovery.

16. The system of claim 14, wherein the Audit and Compliance Module ensures that the standardized data adheres to legal and business policy guidelines.

17. A computer-implemented method for vendor onboarding, comprising:
receiving vendor-specific information at a computing device via a Single Pane of Glass User Interface (SPoG UI);
validating said vendor-specific information through Real-Time Data Exchange Module;
initiating a vendor onboarding process, the vendor onboarding process comprising:
controlling access to vendor-specific information through a Role-Based Access Control (RBAC) Module;
processing the vendor's raw data in various formats via an Agnostic Data Forms (ADFs) Processing Engine to transform the raw data into a canonical, vendor-agnostic format;
storing the transformed data in a Data Mesh;
generating predictive analytics models based on the transformed data; and
utilizing the transformed data for real-time pricing through a Sales and Quoting System.

18. The computer-implemented method of claim 17, further comprising performing initial validation of the vendor's raw data against a predefined schema and integrity checks via the ADFs Processing Engine.

19. The computer-implemented method of claim 17, wherein the ADFs Processing Engine employs attribute matrix analysis and pattern recognition algorithms to transform vendor-specific attributes to a canonical data model.

20. The computer-implemented method of claim 17, further comprising the step of generating actionable insights through artificial intelligence algorithms based on the transformed data, and wherein the Sales and Quoting System incorporates real-time pricing algorithms sensitive to market trends, seasonal variations, and specific customer preferences.

* * * * *